(12) United States Patent
Massard et al.

(10) Patent No.: US 12,032,263 B2
(45) Date of Patent: *Jul. 9, 2024

(54) LIGHT MODULATOR, LIGHT MODULATOR METHOD AND SMART GLAZING

(71) Applicant: eLstar Dynamics Patents B.V., Rockanje (NL)

(72) Inventors: Romaric Mathieu Massard, Eindhoven (NL); Steven Van Mullekom, Eindhoven (NL)

(73) Assignee: ELSTAR DYNAMICS PATENTS B.V., Rockanje (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/383,831

(22) Filed: Jul. 23, 2021

(65) Prior Publication Data

US 2022/0035222 A1 Feb. 3, 2022

Related U.S. Application Data

(63) Continuation of application No. 16/983,729, filed on Aug. 3, 2020, now Pat. No. 11,099,453.

(51) Int. Cl.
| | |
|---|---|
| *G02B 26/00* | (2006.01) |
| *G02F 1/03* | (2006.01) |
| *G02F 1/133* | (2006.01) |
| *G02F 1/167* | (2019.01) |
| *G02F 1/1676* | (2019.01) |
| *G02F 1/1685* | (2019.01) |

(Continued)

(52) U.S. Cl.
CPC ............ *G02F 1/1685* (2019.01); *G02F 1/167* (2013.01); *G02F 1/1676* (2019.01)

(58) Field of Classification Search
CPC .... G02F 1/167; G02F 2001/1678; G02F 1/03; G02F 1/133; G02F 1/061; G02B 26/26; G02B 26/00; G02B 26/083
USPC ........ 359/296, 253–254, 245, 290–291, 298; 349/33; 345/49, 105, 107; 430/31–32
See application file for complete search history.

(56) References Cited

U.S. PATENT DOCUMENTS

| | | | |
|---|---|---|---|
| 4,680,103 | A | 7/1987 | Beilin et al. |
| 5,161,048 | A | 11/1992 | Rukavina |

(Continued)

FOREIGN PATENT DOCUMENTS

| | | |
|---|---|---|
| CN | 112 162 419 A | 1/2021 |
| CN | 113 655 557 A | 11/2021 |

(Continued)

OTHER PUBLICATIONS

Non-Final Office Action, issued in U.S. Appl. No. 17/087,063, dated Sep. 14, 2022, pp. 1-31, U.S. Patent and Trademark Office, Alexandria, VA.

(Continued)

*Primary Examiner* — Dawayne Pinkney
(74) *Attorney, Agent, or Firm* — Crowell & Moring LLP

(57) ABSTRACT

Some embodiments are directed to a light modulator comprising transparent substrates, or a transparent substrate and a reflective or partially reflective substrate, multiple electrodes being applied to the substrates in a pattern across the substrate. A controller may apply an electric potential to the electrodes to obtain an electro-magnetic field between the electrodes providing electrophoretic movement of the particles towards or from an electrode.

20 Claims, 12 Drawing Sheets

(51) Int. Cl.
*G03G 17/04* (2006.01)
*G09G 3/19* (2006.01)

(56) References Cited

U.S. PATENT DOCUMENTS

| | | | |
|---|---|---|---|
| 6,618,109 | B2 | 9/2003 | Hidehira et al. |
| 6,631,022 | B1 | 10/2003 | Kihira |
| 7,177,002 | B2 | 2/2007 | Matsumoto et al. |
| 7,362,400 | B2 | 4/2008 | Itou et al. |
| 8,018,430 | B2 | 9/2011 | Choi et al. |
| 8,054,535 | B2 | 11/2011 | Sikharulidze et al. |
| 8,384,659 | B2 | 2/2013 | Yeo et al. |
| 8,446,663 | B2 | 5/2013 | Kim et al. |
| 8,514,481 | B2 | 8/2013 | Yeo et al. |
| 8,520,286 | B2 | 8/2013 | Clapp et al. |
| 9,013,780 | B2 | 4/2015 | Henzen et al. |
| 9,075,281 | B2 | 7/2015 | Kato et al. |
| 9,176,347 | B2 | 11/2015 | Peng et al. |
| 9,201,282 | B2 | 12/2015 | Henzen |
| 10,921,678 | B2 | 2/2021 | van de Kamer |
| 11,099,451 | B1 | 8/2021 | Massard |
| 2004/0145696 | A1 | 7/2004 | Oue et al. |
| 2005/0185104 | A1 | 8/2005 | Weisbuch et al. |
| 2005/0213191 | A1 | 9/2005 | Whiteside |
| 2007/0046621 | A1 | 3/2007 | Suwabe et al. |
| 2007/0291808 | A1 | 12/2007 | Ledentsov |
| 2009/0040192 | A1* | 2/2009 | Haga .................. G06F 3/0443 345/174 |
| 2009/0321265 | A1 | 12/2009 | Stancovski |
| 2010/0321346 | A1 | 12/2010 | Chae et al. |
| 2011/0290649 | A1 | 1/2011 | Hamada |
| 2011/0249933 | A1 | 10/2011 | Nair |
| 2011/0261432 | A1 | 10/2011 | Yamazaki |
| 2011/0304529 | A1 | 12/2011 | Yeo et al. |
| 2012/0087389 | A1 | 4/2012 | Howe |
| 2012/0090976 | A1 | 4/2012 | Kobayashi et al. |
| 2013/0016420 | A1 | 1/2013 | Yeo et al. |
| 2014/0061049 | A1 | 3/2014 | Lo |
| 2014/0104155 | A1* | 4/2014 | Long .................. G09G 3/344 345/107 |
| 2014/0160412 | A1 | 6/2014 | Peng et al. |
| 2015/0268593 | A1 | 9/2015 | Sasaki et al. |
| 2016/0004368 | A1 | 1/2016 | Kurasawa |
| 2016/0071465 | A1 | 3/2016 | Hung et al. |
| 2016/0187755 | A1 | 6/2016 | Kasegawa |
| 2017/0061895 | A1 | 3/2017 | Paolini, Jr. et al. |
| 2018/0116712 | A1 | 5/2018 | Dong et al. |
| 2018/0239211 | A1 | 8/2018 | Teranishi et al. |
| 2018/0247598 | A1* | 8/2018 | Sainis .................. G02F 1/16766 |
| 2019/0302564 | A1 | 10/2019 | van de Kamer |
| 2019/0324343 | A1 | 10/2019 | Atkinson et al. |
| 2020/0066924 | A1 | 2/2020 | Tombs et al. |
| 2020/0320921 | A1 | 10/2020 | Lin et al. |
| 2021/0055621 | A1 | 2/2021 | Massard |
| 2021/0181594 | A1 | 6/2021 | Jain et al. |

FOREIGN PATENT DOCUMENTS

| | | |
|---|---|---|
| FR | 2842916 A1 | 1/2004 |
| JP | S49 29995 A | 3/1974 |
| KR | 101 067 174 B1 | 9/2011 |
| KR | 20140099421 | 8/2014 |
| WO | WO 03/100758 A1 | 12/2003 |
| WO | WO 2008/012934 A1 | 1/2008 |
| WO | WO 2011/012499 A1 | 2/2011 |
| WO | WO 2014/209119 A2 | 12/2014 |
| WO | WO 2017/026480 A1 | 2/2017 |
| WO | WO 2018/204582 A1 | 11/2018 |
| WO | WO 2021/138344 A1 | 7/2021 |
| WO | WO 2021/228907 A1 | 11/2021 |

OTHER PUBLICATIONS

International Search Report and Written Opinion for PCT/EP2020/052379 dated Mar. 25, 2020.

Non-Final Office Action, issued in U.S. Appl. No. 16/834,588, dated Aug. 3, 2020, pp. 1-43, U.S. Patent and Trademark Office, Alexandria, VA.

Final Office Action, issued in U.S. Appl. No. 16/834,588, dated Oct. 15, 2020, pp. 1-33, U.S. Patent and Trademark Office, Alexandria, VA.

Non-Final Office Action, issued in U.S. Appl. No. 16/778,002, dated Jun. 19, 2020, pp. 1-20, U.S. Patent and Trademark Office, Alexandria, VA.

Notice of Allowance, issued in U.S. Appl. No. 16/778,002, dated Aug. 3, 2020, pp. 1-9, U.S. Patent and Trademark Office, Alexandria, VA.

Notice of Allowance, issued in U.S. Appl. No. 16/834,588, dated Dec. 4, 2020, pp. 1-10, U.S. Patent and Trademark Office, Alexandria, VA.

Notice of Allowance, issued in U.S. Appl. No. 16/944,918, dated May 15, 2021, pp. 1-10, U.S. Patent and Trademark Office, Alexandria, VA.

Non-Final Office Action, issued in U.S. Appl. No. 16/983,729, dated Apr. 26, 2021, pp. 1-20, U.S. Patent and Trademark Office, Alexandria, VA.

International Search Report and Written Opinion from corresponding International Application No. PCT/EP2021/071346, dated Nov. 3, 2021, 15 pp.

Office Action from U.S. Appl. No. 17/398,239, dated Feb. 28, 2023, pp. 1-26.

Final Office Action from U.S. Appl. No. 17/087,063, dated Jun. 1, 2023, pp. 1-26.

International Search Report and Written Opinion from International Application No. PCT/EP2022/056315, Jun. 7, 2022, 15 pp.

International Search Report and Written Opinion from International Application No. PCT/EP2023/065535, Sep. 1, 2023, 15 pp.

International Search Report and Written Opinion from International Application No. PCT/EP2022/080773, May 11, 2023, 30 pp.

Extended European Search Report from European Application No. 22215020.3-1207, May 30, 2023, 9 pp.

Aieta et al. "Supplementary Materials for Multiwavelength Achromatic Metasufaces by Dispersive Phase Compensation," Science, vol. 347, No. 6228, (2015) pp. 1342-1345.

Abdelraouf et al. "Recent Advances in Tunable Metasurfaces: Materials, Design and Applications," ACS Nano, vol. 16, No. 9 (2022) pp. 13339-13369.

Turing, "The Chemical Basis of Morphogenesis," Philosophical Transaction of the Royal Society of London. Series B, Biological Sciences, vol. 237, No. 641 (1952), pp. 37-72.

Murray et al. "Numerial comparison of grid pattern diffraction effects through measurement and modeling with OptiScan software," Proc. of SPIE, vol. 8016 (2011) pp. 1-15.

Nockert, "AI for Game Programming 2: Maze Generation (A3.6)," (Jan. 8, 2020) pp. 1-12.

Yonghe et al. "A Simple Sweep-line Delaunay Triangulation Algorithm," Journal of Algorithms and Optimization, vol. 1, Iss. 1 (2013) pp. 30-38.

Skyum, "A Sweepline Algorithm for Generalized, Delaunay Triangulations," Daimi Report Series, vol. 20, issue 373 (1991) pp. 1-21.

Tao et al. "Reversible Metal Electrodeposition Devices: An Emerging Approach to Effective Light Modulation and Thermaal Management," Adv. Optical Mater. vol. 9 (2021) pp. 2001847-1 to 2001847-15.

Hu et al. "Efficient full-path optical calculation of scalar and vector diffraction using the Bluestein method," Light: Science & Applications, vol. 9, issue 119 (2020) pp. 1-11.

Leutenegger et al. "Fast focus field calculations," Optics Express, vol. 14, No. 23 (2006), pp. 11277-11290.

California et al. "Silver grid electrodes for faster switching ITO free electrochromic devices," Solar Energy Materials & Solar Cells, vol. 153 (2016), pp. 61-67.

Kim et al. "Non-uniform sampling and wide range angular spectrum method," J. Opt. vol. 16 (2014) pp. 125710-1 to 125710-9.

Li et al. "Large-area metassurface on CMOS-compatible fabrication platform: driving flat optics from lab to fab," Nanophotonics, vol. 9, issue 10 (2020) pp. 3071-3087.

(56) References Cited

OTHER PUBLICATIONS

Devlin et al. "High effciency dielectric metasurfaces at visble wavelengths," eprint arXiv:1603.02735 (2016) pp. 1-18.
Toskov et al. "Modeling and fabrication of Pt micro-heaters buiolt on alumina Substrate," Proceedings of the 36th International Spring Seminar on Electronics Technology (2013), pp. 1-7.
Fan, "Freeform Metasurface Design Based on Topology Optimization," MRS Bulletin, vol. 45, (2020), pp. 196-201.
Chen et al. "Flat optics with dispersion-engineered metasurfaces," Nature Reviews Materials, vol. 5 (2020), pp. 604-620.
Nie et al. Broadband Light Bending with Plasmonic Nanoantennas, Science, vol. 335 (2016), pp. 427-428.
Maniscalco et al., "Thin film thickness measurements using Scanning White Light Interfometry," Thin Solid Films, 550 (2014) pp. 10-16.
Notice of Reasons for Refusal and English translation from JP2021-545949, dated Sep. 12, 2023, pp. 1-11.
C. Qiu et al., "Trasparent Ferroelectric Crystals with Ultrahigh Piezoelectricity," *Nature*, 577 (2020) pp. 350-367.
Partial European Search Report from European application No. 2320539.5-1020, Mar. 22, 2024, 16 pp.

\* cited by examiner

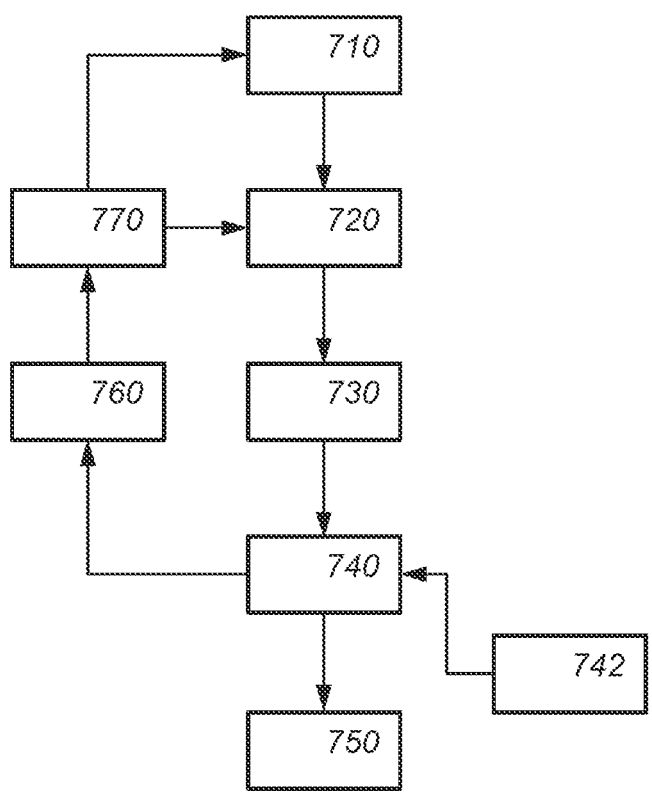
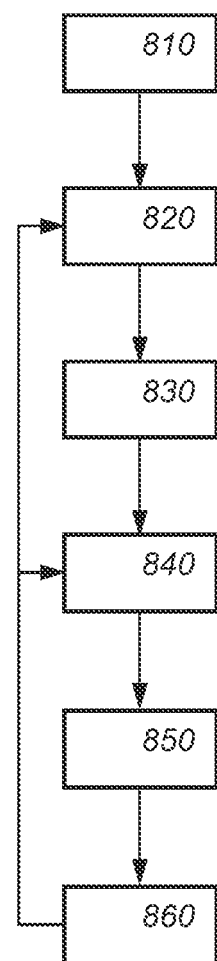
Fig. 7
Fig. 8

LIGHT MODULATOR, LIGHT MODULATOR METHOD AND SMART GLAZING

FIELD

The presently disclosed subject matter relates to a light modulator, a light modulator method and a computer readable medium.

BACKGROUND

U.S. patent application Ser. No. 11/041,579, 'Optically active glazing', publication number US20050185104 A1, discloses known optically active glazing, and is incorporated herein by reference.

The known system comprises two parallel plates, made from a transparent, or reflective or partially reflective material such as glass or a plastic material. The internal volume defined between the plates is subdivided into a plurality of small independent volumes or individual cells that are filled with a dielectric liquid. The liquid contains a suspension of particles of a dielectric material. The facing faces of the two plates carry electrodes facing each other. The electrodes are connected to an electrical power supply associated with a control means.

The electrodes of each plate are formed by combs that are interleaved into one another in pairs. The electrodes of two interleaved combs are capable of taking up electrical voltages of polarities that are identical or opposite. With a suitable voltage on the electrodes the particles can be concentrated at different locations between the electrodes to give the system either a transparent or an opaque appearance.

A disadvantage of the known system is that the optical state of the system is unknown to the driver. The state can be approximated to some extent by keeping track of the amount of time some driving signal has been applied, but the accuracy of this approach is low. Moreover, if the panel was in an off-state, especially for some time, then the state of the panel is unknown.

SUMMARY

It would be advantageous to have an improved light modulator. A light modulator is provided that comprises at least one current sensing circuit connected to an electrode on a substrate. The current sensing circuit is configured to measure a current in the electrode to which it is connected. A controller determines driving signals for the electrodes at least from the current measured by the current sensing circuit to reach or maintain a target transparency or reflectivity. Interestingly, the location of the charged or chargeable particles in the light modulator changes both the optical properties of the light modulator as well as the current in the electrodes. By measuring the latter, information is obtained about the former. In an embodiment, at least one current sensing circuit is provided, e.g., for at least two electrodes on the same substrate, in particular, neighboring electrodes, or for two opposite electrodes on opposite substrates. In an embodiment, all electrodes have a corresponding current sensing circuit.

For example, current may be measured periodically in the electrode so that the driving signal can be adapted as the transparency or reflectivity of the light modulator changes.

A light modulator is also known as an optical modulator. A light modulator provides a transparent or reflective panel of which the transparency or reflectivity can be modified. In an embodiment, color or color intensity, etc., may be changed. A light modulator may be used as cover, e.g., a cover of a container, e.g., a closet, cabinet, and the like. An especially advantageous application is in smart glazing. Smart glazing is also referred to as smart windows.

In embodiments, there are at least two electrodes on each substrate, but there may be more than two electrodes. For example, at least three electrodes may be applied to at least one of the first substrate and the second substrate. For example, in an embodiment two electrodes may be applied to a first substrate and three electrodes to a second substrate. In an embodiment, at least three electrodes are applied to each substrate. At least two current sensing circuits may be applied to the at least three electrodes.

A system in which one substrate has at least two electrodes and the other has at least three electrodes has various advantages. For example, such a light modulator may be driven so that the so-called curtain effect is reduced. The curtain effect happens during closing of the window (i.e., moving to a dark, opaque, or non-transparent state), in which it appears that a curtain is drawn between the electrodes. The curtain effect is a disadvantage, as it is visibly distracting in itself, and it also increases diffraction. On a side with 3 electrodes the electrodes can be closer together than on a side with 2 electrodes, e.g., below 50 micron, more preferably below 40 micron, e.g., 35 micron. This means that the electric field is stronger. Accordingly, closing is faster and the curtain effect is reduced. With a 2+2 electrode panel moving the electrodes closer together would lead to a reduced maximum transparency or reflectivity, but when an additional electrode is available this is avoided. When opening some of the additional electrodes may be unused, so that there is little loss of maximum transparency or reflectivity. Additional electrodes on a substrate, e.g., electrodes over two, may be configured not to attract particles when opening the panel, but to attract particles when closing the panel.

A further aspect of the invention is a building comprising a light modulator according to an embodiment. A further aspect of the invention is a car comprising a light modulator according to an embodiment. For example, the car and/or building may comprise the light modulator and a controller configured for controlling transparency or reflectivity of the light modulator by controlling voltage on electrodes of the light modulator. The controller being electrically connected or connectable to the light modulator.

Light modulator and smart glazing are electronic devices, which may be driven by a power source, e.g., under control of a controller. For example, the controller may instruct the power source to apply a particular waveform to particular electrodes to achieve various transparency or reflectivity effects or the lack thereof.

An embodiment of the method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when the program product is executed on a computer.

In an embodiment, the computer program comprises computer program code adapted to perform all or part of the steps of an embodiment of the method when the computer program is run on a computer. Preferably, the computer program is embodied on a computer readable medium.

BRIEF DESCRIPTION OF THE DRAWINGS

Further details, aspects, and embodiments will be described, by way of example only, with reference to the drawings. Elements in the figures are illustrated for simplicity and clarity and have not necessarily been drawn to scale. In the figures, elements which correspond to elements already described may have the same reference numerals. In the drawings, FIG. 1 schematically shows an example of an embodiment of a light modulator, FIG. 2a schematically shows an example of an embodiment of a substrate, FIG. 2b schematically shows an example of an embodiment of a substrate, FIG. 3a schematically shows an example of an embodiment of a controller, FIG. 3b schematically shows an example of an embodiment of a controller, FIG. 4a schematically shows an example of an embodiment of a current sensing circuit, FIG. 4b schematically shows an example of an embodiment of a current sensing circuit, FIGS. 5a-5c schematically show an example of an embodiment of opening a light modulator, FIGS. 6a and 6b schematically show an example of an embodiment of closing a light modulator, FIG. 7 schematically shows an example of an embodiment of controlling a light modulator, FIG. 8 schematically shows an example of an embodiment of controlling a light modulator, FIG. 9a schematically shows an example of an embodiment of a light modulator, FIG. 9b schematically shows an example of an embodiment of a light modulator, FIG. 9c schematically shows an example of an embodiment of a car, FIGS. 10a-10c schematically show an embodiment of a light modulator, FIG. 11 schematically shows an example of an embodiment of a method of controlling a light modulator, FIG. 12a schematically shows a computer readable medium having a writable part comprising a computer program according to an embodiment, FIG. 12b schematically shows a representation of a processor system according to an embodiment.

LIST OF REFERENCE NUMERALS IN FIGS. 1, 2A-6B, 9A-10C, 12A-12B

Figure 1:
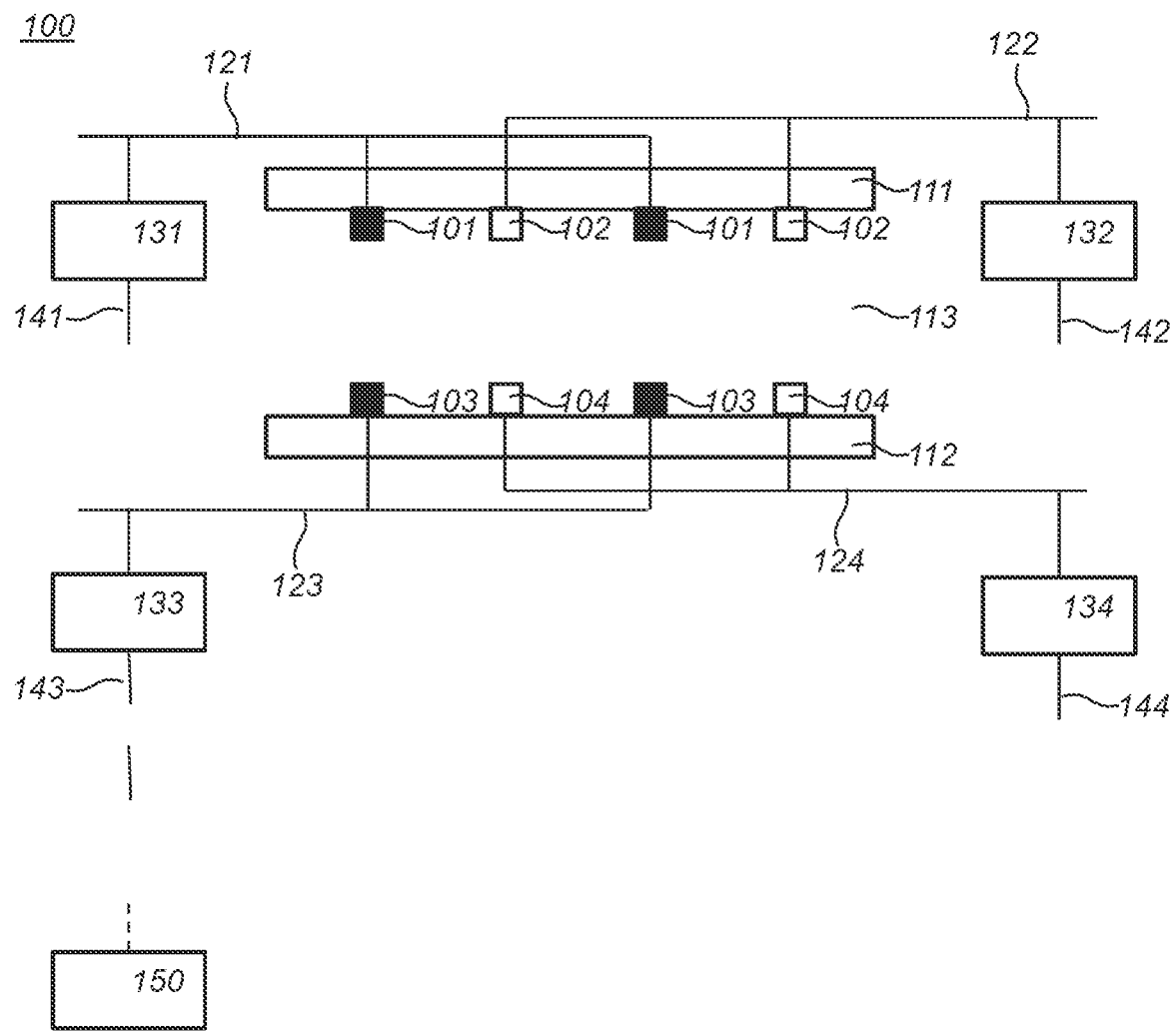

The following list of references and abbreviations is provided for facilitating the interpretation of the drawings and shall not be construed as limiting the claims.
10 a light modulator
11 a first substrate
12 a second substrate
13, 13a, 13b electrodes
14, 14a, 14b electrodes
15 a fluid
16 a controller
30 particles
20 a car
21 a light modulator
40 a light modulator
41 a first substrate
42 a second substrate
43 a third substrate
46 a controller
100 a light modulator
101-104 an electrode
111, 112 a substrate
113 an optical layer
121-124 a driving line
131-134 a current sensing circuit
141-144 current sensing signal line
150 a controller
200 a substrate
201 a first direction
202 a second direction
210 a first electrode
211-213 a main-line
220 a second electrode
221-223 a main-line
310 a controller
330 a processor system
340 a storage
350 an interface
361 a calibration unit
370 a controlling unit
371 a target transparency unit
381 a driver
382 a current sensing interface
383 a sensor interface
390 a light modulator panel
391 a sensor
401 a resistor
411 a current sensing circuit
422 a current signal
431, 432 a buffer
440 a programmable gain amplifier
441 a current signal
442 a gain signal
511-514 a driving signal
611-614 a driving signal
1000 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DETAILED DESCRIPTION OF EMBODIMENTS

While the presently disclosed subject matter is susceptible of embodiment in many different forms, there are shown in the drawings and will herein be described in detail one or more specific embodiments, with the understanding that the present disclosure is to be considered as exemplary of the principles of the presently disclosed subject matter and not intended to limit it to the specific embodiments shown and described.

In the following, for the sake of understanding, elements of embodiments are described in operation. However, it will be apparent that the respective elements are arranged to perform the functions being described as performed by them. Further, the subject matter that is presently disclosed is not limited to the embodiments only, but also includes every other combination of features described herein or recited in mutually different dependent claims.

FIG. 1 schematically shows an example of an embodiment of a light modulator 100.

Light modulator 100 comprises a first substrate 111 and a second substrate 112. The first and second substrates arranged with inner sides opposite to each other.

Multiple electrodes are applied to the inner side of each of the first and second substrates. Shown in cross-section are electrodes 101 and 102 on the inner side of substrate 111, and electrodes 103 and 104 on the inner side of substrate 112. Each of the multiple electrodes is arranged in a pattern across the substrate. Examples of such patterns are given below. In FIG. 1, two electrodes are shown on two substrates. A light modulator may have more than two substrates, and a substrate may have more than two electrodes. Having more than two electrodes increases transition speed, and improves driving of the light modulator.

Typically, a multiple-electrodes substrate is vertically aligned to another multiple-electrodes substrate, but this is not necessary. For example, off-set placement may be used to reduce a parallax effect. There may be more substrates stacked above or below substrates 111 or 112.

Between substrate 111 and 112 is an optical layer 113. The optical layer comprises a fluid in which particles are suspended. The particles are electrically charged or chargeable, and are adapted to absorb or reflect light. The reflection may be diffuse or specular reflection or in between. If there are multiple optical layers, e.g., using 3 or more substrates, then the particles in a different layer may have different optical properties, e.g., absorb or reflect at different wavelengths.

An electric potential, e.g., a voltage can be placed on the electrodes through a driving line. As shown in FIG. 1: Electrodes 101-104 are electrically connected to driving lines 121-124 respectively. The driving lines 121-124 may be connected to a controller 150 configured to place particular voltages on the driving lines. The electric potential causes electrophoretic movement of the particles which in turn affects the optical properties of light modulator 100, e.g., its transparency or reflectivity.

Many parameters of a light modulator may be varied to suit the needs of the application. For example, some applications need very dark, less transparent solutions while others need very transparent and less dark solutions. For some applications, energy efficiency is important, other less so. Some applications want fast transitions, while others want high stability. These needs can often be met, e.g., by choosing the right fluid, particles, electrode and substrate dimensions and so. Driving such a variety of panels provides a challenge, which is also alleviated with current sensing. In an embodiment, the hardware of a single controller design can be used with multiple panel types. Current measuring allows the controller to adapt the driving signals to the panel.

Light modulator 100 comprises at least one current sensing circuit connected to an electrode on a substrate. A current sensing circuit measures current in the electrode to which it is connected. The amount of current passing through an electrode depends on the position of the particles in the fluid with respect to the electrodes. Accordingly, measuring current in an electrode gives an indication of the number of particles near that electrode. The position of the particles gives an indication of the optical state of the light modulator. Accordingly, having only one circuit sensing circuit is preferable to having none, but to obtain more information from the panel, more circuit sensing circuits can be placed. It is advantageous, to have at least two circuit sensing signals, e.g., in neighboring electrodes on the same substrate or in opposite electrodes on opposite substrate, since in this case a current between two electrodes can be computed from the measured currents. Even more preferably, and as shown, a circuit sensing circuit is connected to each electrode of each substrate. As shown in FIG. 1: current sensing circuits 131-134 are connected to driving lines 121-124 respectively. For example, the current sensing circuits may be part of the controller that drives the light module. The current sensing circuit could be part of one or more of the substrates. For example, a light panel may comprise the current sensing circuits between the substrate, e.g., in the optical layer and electrically connected to the electrodes.

The current sensing circuits generate a current sensing signal which is transmitted to controller 150, e.g., over corresponding current sensing signal lines 141-144. The controller 150 is configured to receive at least one current sensing signal from the at least one current sensing circuits. As shown in FIG. 1: the controller 150 is configured to receive current sensing signal from current sensing circuits 131-134. The current sensing circuits may be part of controller 150, in which case, the current sensing signal lines may also be internal to controller 150. The controller is configured to determine an appropriate driving signal for the electrodes from at least the received current sensing signals.

The substrates, e.g., substrates 111-112, optical layers, e.g., layer 113, the electrodes, e.g., electrodes 101-104, and possibly part of the driving lines, e.g., lines 121-124 together constitute the panel part of light modulator 100. Controller 150 may be integrated with the panel, but may also be connected through a wire, etc., with the panel.

Figure 2A:
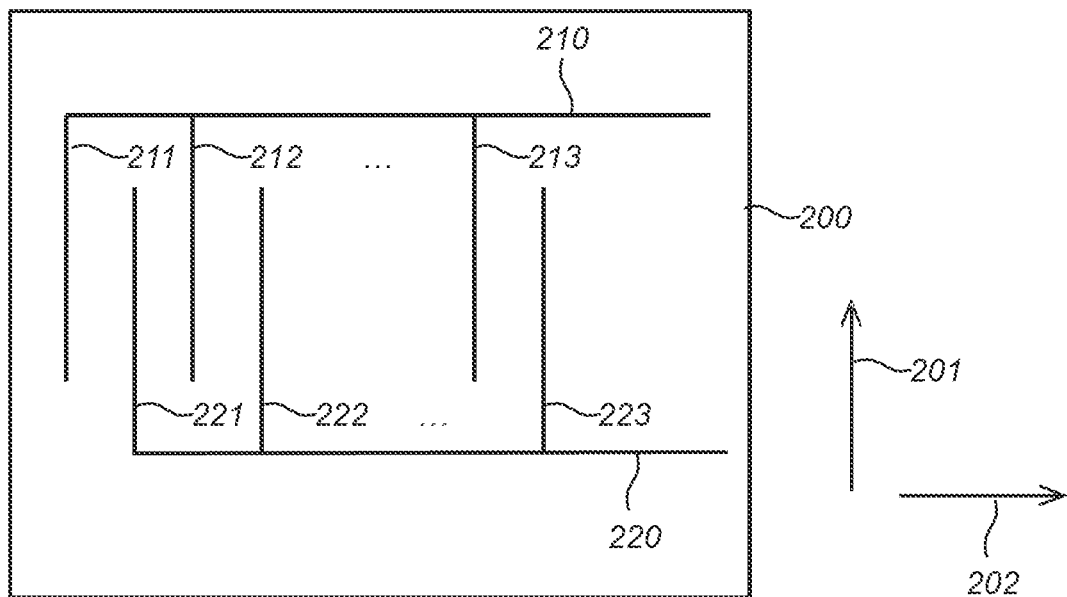

FIG. 2a schematically shows an example of an embodiment of a substrate 200. There are at least two electrodes arranged in a pattern across a surface of substrate 200. Shown in FIG. 2a are two electrodes on the same surface: a first electrode 210 and a second electrode 220. There could be more than two electrodes on the same side of the substrate, e.g., to facilitate more fine-grained control. For example, multiple electrodes may be used to facilitate a pixelated substrate, e.g., for a pixelated light modulator. Below an embodiment with two electrodes is shown, but additional electrodes could be added to them, e.g., by replicating similar structures next to each other.

First electrode 210 and second electrode 220 are applied to a same side of the substrate. The two electrodes are arranged in a pattern across the substrate. There could also be one, two or more electrodes on the other surface of substrate 200, e.g., to facilitate stacking of three or more substrates. Applying electrodes to a substrate may be done lithographically, e.g., using a mask representing the electrodes pattern. Electrodes may also be applied by embedding them in the substrate.

First electrode 210 and second electrode 220 each comprise a multiple of main-lines. As shown in FIG. 2a, first electrode 210 comprises main-lines 211, 212, and 213, and second electrode 220 comprises main-lines 221, 222 and 223. Typically, each electrode will comprise more lines than three. The main-lines extend across the substrate. The multiple of main-lines of the first and second electrode are arranged alternatingly with respect to each other on the substrate. The main-lines extend across the substrate in a first direction 201. When viewed in a second direction 202, the main-lines are encountered alternately from different multiples, e.g., from the first and second multiple in the first and second electrode respectively. The first and second direction make an angle with each other, typically the angle is substantially perpendicular. The first and second direction may each be parallel to a side of the substrate, but this is not necessary.

A motivating application for a substrate such as substrate 200 is in smart glazing, e.g., a light modulator, which may be applied in domestic housing, offices, green houses, cars, and the like. The level of transparency or reflectivity of the smart glazing can be adapted electrically. For example, in smart glazing two substrates such as substrate 200 would be stacked so that the sides on which the two electrodes are applied face each other. A fluid with particles is enclosed between the two substrates. In an embodiment, electrodes, e.g., two or more electrodes are applied to one surface of each substrate. There could also be one, two or more electrodes on the other surface of substrate 200, e.g., to facilitate stacking of three or more substrates.

Having two sets of alternating main-lines is sufficient to provide electrically adaptable glazing; due to the alternating two sets the electric field at any part of the substrate can be controlled as two opposite electrodes border the part from two opposing sides.

Figure 2B:
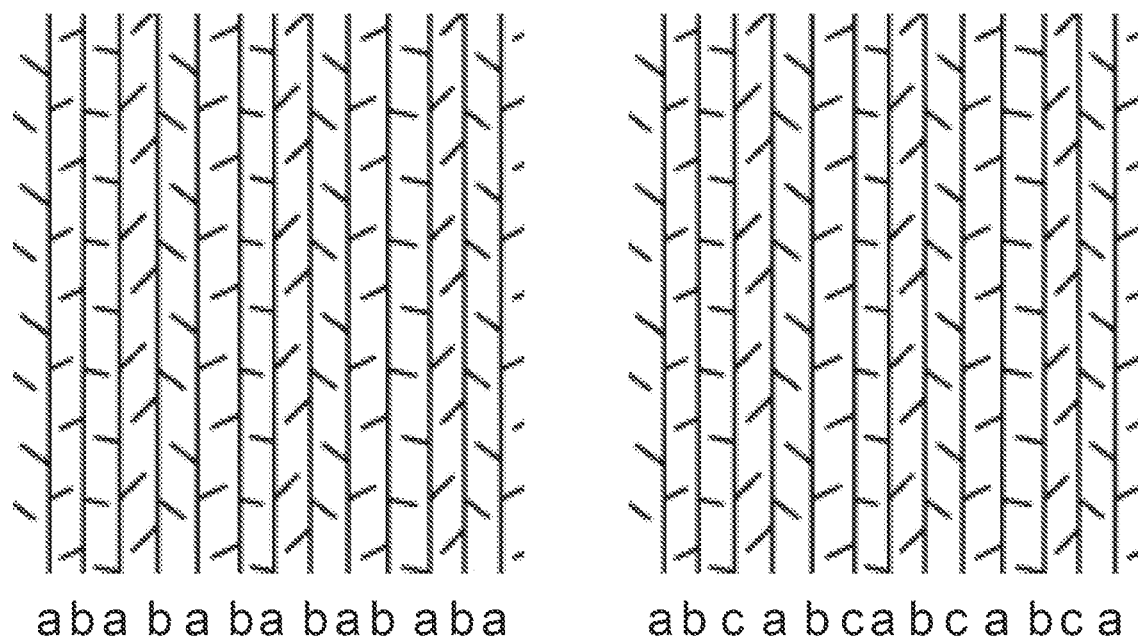

FIG. 2b schematically shows two examples of embodiments of substrates with electrode patterns according to an embodiment. The embodiments shown in FIG. 2b are to scale, and can be extended to a full electrode pattern, e.g., following an interdigitated pattern. As an example, FIG. 2b shows how the basic pattern of multiple main-lines can be extended with various features. For example, in FIG. 2b a pattern of branches is connected to the main lines. Although such branches are not necessary, they reduce diffraction. Another possible extension is to include waves in the main-lines.

Figure 3A:
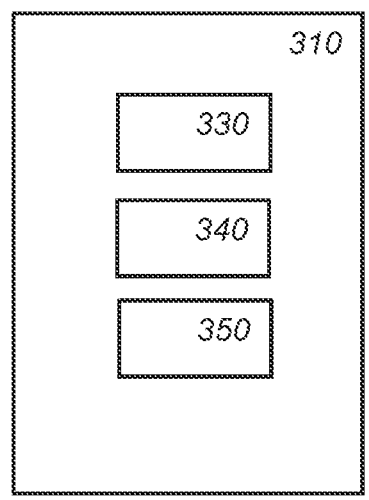

FIG. 2b schematically shows an example of an embodiment of a substrate arranged for two or for three electrodes. The left of FIG. 2b indicates with the letters 'a' and 'b' which main lines belong to the same electrode. All lines marked 'a' are connected electrically, although this is not shown in the detail of the electrode patterns shown in FIG. 2b; likewise for main-lines 'b'. The right of FIG. 2b indicates with the letters 'a', 'b' and 'c' which main lines belong to the same electrode. All lines marked with the same letter are connected electrically. Lines marked with a different letter are not connected electrically. Two of the substrates at the left of FIG. 5b may be combined into a 2+2 electrode light modulator. Two of the substrates at the right of FIG. 5b may be combined into a 3+3 electrode light modulator FIG. 3a schematically shows an example of an embodiment of a controller 310. For example, the controller 310 of FIG. 3a may be used to control a light modulator, e.g., a light modulator as shown in FIG. 1. Controller 310 may be used for controller 150. Controller 310 may comprise a processor system 330, a storage 340, and a communication interface 350. Storage 340 comprises local storage, e.g., a local hard drive or electronic memory. Storage 340 may also comprise non-local storage, e.g., cloud storage. In the latter case, storage 340 may comprise a storage interface to the non-local storage.

Controller 310, e.g., communication interface 350, is configured to communicate with a light modulator for controlling the light modulator. The communication with the light modulator may comprise electric wiring, e.g., to drive the panel and to receive sensor signals, including current sensing signals. In controller 310, the communication interface 350 may be used to send or receive analog data and/or digital data. For example, communication interface 350 may be configured for one or more of the protocols: UART, SPI, I2C, CAN, etc.

For example, driving and sensing signals may be analog. For example, sensing signals may be digital, e.g., converted to digital. A driving signal could be digital and converted to actual voltage levels locally at the light modulator.

Controller 310 may communicate with other systems, external storage, input devices, output devices, and/or one or more sensors over a computer network. The computer network may be an internet, an intranet, a LAN, a WLAN, etc. The computer network may be the Internet. The controller comprises a connection interface which is arranged to communicate outside of the device as needed. For example, the connection interface may comprise a connector, e.g., a wired connector, e.g., an Ethernet connector, an optical connector, etc., or a wireless connector, e.g., an antenna, e.g., a Wi-Fi, 4G or 5G antenna.

The execution of controller 310 may be implemented in a processor system, e.g., one or more processor circuits, e.g., microprocessors, examples of which are shown herein. Controller 310 may comprise multiple processors, which may be distributed over different locations. For example, controller 310 may use cloud computing. Controller 310 may also or instead comprise a state machine.

Figure 3B:
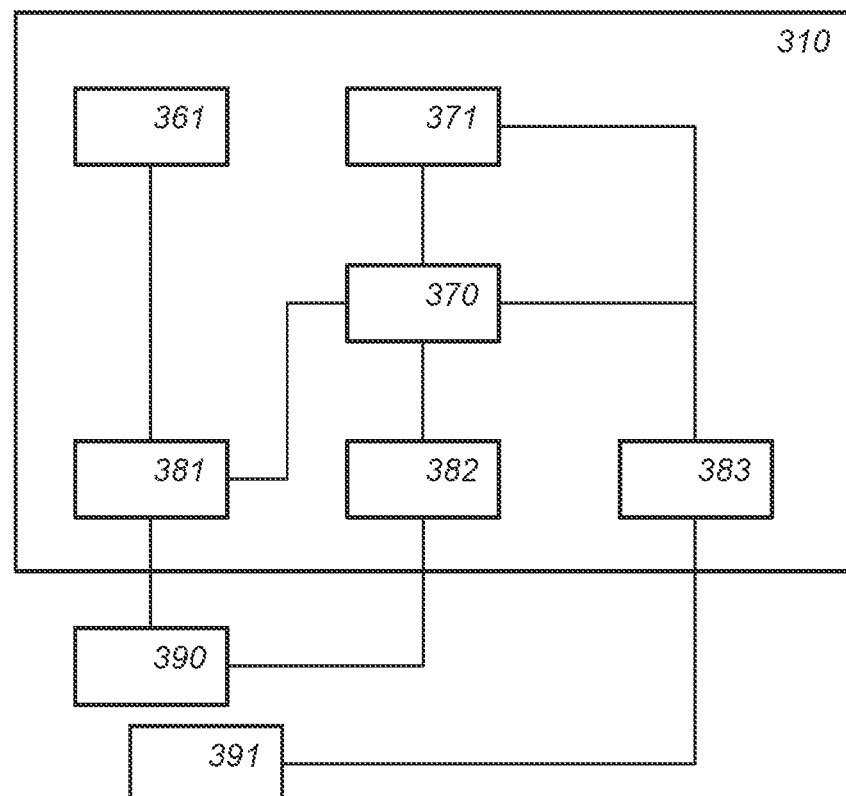

FIG. 3b shows functional units that may be functional units of the processor system. For example, FIG. 3b may be used as a blueprint of a possible functional organization of the processor system. The processor circuit(s) are not shown separate from the units in these figures. For example, the functional units shown in FIG. 3b may be wholly or partially implemented in computer instructions that are stored at controller 310, e.g., in an electronic memory of controller 310, and are executable by a microprocessor of controller 310. In hybrid embodiments, functional units are implemented partially in hardware, e.g., as coprocessors, and partially in software stored and executed on controller 310.

FIG. 3b schematically shows an example of an embodiment of a controller 310. Controller 310 is configured to control a light modulator panel 390. Light modulator panel 390 comprises multiple substrates each with corresponding multiple electrodes on the substrates and at least one optical layer enclosed between the substrates.

Light modulator panel 390 may be according to an embodiment, e.g., as described in connection with FIG. 1 or FIGS. 9a-9c, etc. One or more current sensing circuits may be comprised in controller 310; instead the current sensing circuits may be comprised in light modulator panel 390. Preferably, light modulator panel 390 or controller 310 comprises multiple current sensing circuits, e.g., one for each electrode in light modulator panel 390. Also shown in FIG. 3b is an optional sensor 391 cooperating with panel 390. Sensor 391 may comprise additional sensors, e.g., temperature or light sensors, as further explained herein.

Controller 310 comprises a driver 381. Driver 381 is configured to apply an electric potential, according to a driving signal, onto the electrodes on the substrates of light modulator panel 390 to obtain an electro-magnetic field between the electrodes. The electro-magnetic field provides electrophoretic movement of particles in light modulator panel 390 towards or from an electrode. For example, the driving signal may directly be applied to the electrodes. For example, the driving signal may be indicative; for example, driver 381 may amplify the driving signal before applying it to the electrodes. Driver 381 may be connected to a power supply. Driver 381 could be local panel 390 instead of comprised in controller 310.

Controller 310 comprises a current sensing interface 382 configured to receive at least one current sensing signal from the at least one current sensing circuit indicating current in the connected electrode. For example, current sensing interface 382 may receive current sensing signals from all electrodes on all substrates. For example, when connected to the light modulator shown in FIG. 1, current interface 382 may receive current sensing signals from electrodes 101-104. In an embodiment, the current sensing circuits are integrated with driver 381, and interface 382 may receive the current sensing signals from driver 381. The current sensing signals may be analog or digital; They may be converted from analog to digital, e.g., at interface 382, at the current sensing circuits, or the like.

Optionally, controller 310 comprises a sensor interface 383 configured to receive sensor signals from sensor 391. Sensor 391 may be arranged on, or in, or near panel 390. Sensor 391 may be multiple sensors.

Controller 310 may optionally comprise a calibration unit 361. For example, calibration may be performed for panel 390 during manufacture, or may even be performed for another but similar panel. However, better results are obtained if calibration unit 361 is present in controller 310. An advantage of having calibration unit 361 in controller 310 is that re-calibration can be performed locally. This is an advantage, since the response of light modulator panel 390 may change over time.

Calibration unit 361 is configured to determine the response of light modulator panel 390 as it receives driving signals. For example, calibration unit 361 may drive panel 390 to a known state and measure the current in the electrodes in the known state. A known state may be obtained by using sensors 391, e.g., a transparency sensor may be arranged on panel 390 to measure a transparency of the panel. However, a known state can be obtained without having a transparency sensor, by applying an electric potential to the electrodes to drive the light modulator to maximum transparency or to minimum transparency. After applying the electric potential for a time interval, e.g., a pre-determined time interval chosen to give panel 390 time to reach maximum transparency or to reach minimum transparency, the current sensing signals may be obtained from the multiple current sensing circuits. As a result, current in the electrodes is obtained when panel 390 is in a known state. Likewise, in another example, a reflectivity sensor may be arranged on panel 390 to measure a reflectivity of the panel. After applying the electric potential for a time interval, e.g., a pre-determined time interval chosen to give panel 390 time to reach maximum reflectivity or to reach minimum reflectivity, the current sensing signals may be obtained from the multiple current sensing circuits During use, after calibration, the drive signals may be determined from current sensing signals obtained in a use phase and the current sensing signals obtained in an earlier calibration phase for a known state, and from, say, a target transparency or reflectivity.

Calibration values for the current in the electrodes when panel 390 is in a known state are advantageously obtained locally, e.g., after panel 390 has been installed. For example, panel 390 may be smart glazing in a building or a car. Interestingly, calibration unit 361 allows recalibration. For example, controller 310 may be configured to calibrate light panel 390 in various circumstances. For example, when turning the light modulator on for the first time. For example, when turning the light modulator on after being turned off for more than a threshold time. For example, when measuring out of range currents. For example, when a target transparency or reflectivity level is not reached within a threshold time.

Controller 310 comprises a controlling unit 370. Controlling unit 370 is configured to determine driving signals for the electrodes from the at least one current sensing signals and from a target transparency or reflectivity.

In an embodiment, the driving signals indicate an alternating current (AC) in the electrodes. The amplitude, frequency or bias of the driving signal may be different for different operations; for example, when closing, opening or measuring the panel 390, the amplitude, frequency or bias may differ.

Typically, the drive signals will indicate AC current, though the driving signals could contain elements of DC bias, but nevertheless the driving signal is preferably balanced to avoid corrosion of the electrode material. For example, if panel 390 has been driven in DC for a first time interval, it is preferably driven with the opposite polarity for a second time interval after that; the length of the first and second interval or the voltages applied in them need not be the same. To avoid corrosion of the electrodes the lengths of the time intervals and the voltages applied in them are chosen so that loss and gain of electrode material of the electrodes is balanced. For example, in an exemplifying embodiment one may say drive using 1 volt DC for some time; later the voltage may be 0.6 volt DC in the opposite polarity for a different amount of time. Balancing current is easier with AC driving signals.

Controlling unit 370 may be configured to determine a transparency or reflectivity level of the light modulator from the at least one current sensing signals. From the current signals per electrode a current value may be computed between particular electrodes, e.g., as a difference between the measured current values. The computed current between electrodes is indicative of the number of particles between them. If the particles are mostly between electrodes on the same substrate then the panel is opaque. If the particles are mostly between opposite electrodes of the two substrates and both substrates are transparent then the panel is transparent. If the particles are mostly between opposite electrodes of the two substrates and one of the substrates is reflective, then the panel is reflective. Intermediate states can be obtained if one of the substrates is partially reflective.

For example, consider current measurements for electrodes 101-104 of values $I_1$, $I_2$, $I_3$, $I_4$. The state of the panel may be computed as $f(I_2, I_3, I_4, h)$, wherein $f$ is a function and h is additional information that is available, e.g., temperature. In an embodiment multiple functions $f_i$ are computed. The latter may be used in case some of the function have less accuracy for some states, e.g., when the function is close to zero, or a particular function may be used to drive to a particular state or range of states.

Current between electrodes 101 and 102 may be computed as: $I_{12}=abs\,(I_1-I_2)$. Current between electrodes 101 and 103 may be computed as: $I_{13}=abs\,(I_2-I_3)$. Current may be also computed between groups of current as the sum of $I_{12}$ and $I_{34}$ for example, or any other mathematical combinations.

When current between electrodes on the same substrate is high, e.g., if $I_{12}$ is high, the panel is opaque. When current between electrodes on opposite substrates is high, e.g., if $I_{13}$ is high, the panel is transparent if both substrates are transparent; the panel is reflective if one of the substrates, e.g. the bottom substrate, is reflective. Intermediate states can be obtained if one of the substrates is partially reflective. Either value, e.g., $I_{12}$ or $I_{13}$, may be used to determine the optical state of panel 390. There is an advantage in determining them both. When opening panel 390, e.g., when driving to increase the transparency or reflectivity of panel

390, also known as vertical drive, one may primarily use $I_{13}$ since $I_{12}$ becomes increasingly small and less accurate as the panel opens. Likewise, when driving the panel to decrease transparency or reflectivity, also known as horizontal drive, one may primarily use $I_{12}$.

Note that one can also drive diagonally, which will cause the particles to localize in the center. In this case the currents will equalize. Driving diagonally disperses the particles fast, and is a good way to close the panel. Diagonal driving may be used, e.g., to turn off the panel. One may compute the diagonal current as $I_{14}$=abs $(I_1-I_4)$. In an embodiment, diagonal driving is used in combination with vertical or lateral driving and an electrode configuration the first substrate and the second substrate each contain two electrodes. In an embodiment, diagonal driving is used in combination with an electrode configuration wherein at least three electrodes are applied to at least one of the first substrate and the second substrate.

The absolute functions (abs) facilitate easy computation of the currents, but are actually not necessary when care is taken to measure current with the correct polarity. Current may be also computed between groups of current as the sum of $I_{12}$ and $I_{34}$ for example, or any other mathematical combinations.

Thus, the state of panel 390 may be determined from currents between electrodes, which in turn can be computed from current on the electrodes. The electrical currents between electrodes are dependent on the location of the charged particles in the optical layer, e.g., in the dielectric fluid, while the locations of those particles directly impact the transparency or reflectivity level of the light modulator. By computing a vertical, horizontal, diagonal and/or combinations thereof of currents between electrodes an indication of the transparency or reflectivity state of panel 390 is obtained. In the examples give above, horizontal, vertical and diagonal current is computed. However, any intermediate combination between these three directions can be taken. Using another combination of electrodes as a computed current has an advantage when driving toward a transparency or reflectivity that correspond to a similar combination of electrode currents, as this increases accuracy.

Computed currents between electrodes may be directly used to compute a driving signal. For example, controlling unit 370 may drive open panel 390 so that $I_{13}$ achieves a particular value. Later the panel can be driven towards the same value of $I_{13}$ again. For example, this may be used to ensure that equal transparency or reflectivity levels are achieved on different days. In this case calibration values are not strictly needed.

However, when calibrated values are available, one can compute current between electrodes in the known state and compute current for any intermediate state and drive towards them. Moreover, calibration values allow driving towards the same transparency or reflectivity on different occasions, even if the response of the panel has changed, e.g., as a result of aging, or a temperature change, etc.

For example, one may compute $I_{13}$ during calibration for two known states, e.g., fully dark and fully transparent, or fully dark and fully reflective. To achieve a particular intermediate transparency or reflectivity, e.g., x % transparency or reflectivity, one may drive toward a value of the current between electrodes, e.g., $I_{13}$, that lies at x % between the calibrated values. If calibration is only done for the fully transparent state, one may assume that $I_{13}$ for the fully closed state is 0, likewise for the other values. However, calibrating with two known states is preferable.

In other words, during calibration minimum and maximum values are obtained for the current between two electrodes. In a use phase, after the calibration phase, the current between the electrodes may be taken as an indication of the transparency or reflectivity of the panel. For example, going toward a dark state corresponds to this particular low current, going to a transparent or reflective state to this high current, etc. A grey scale may be used when driving towards an intermediate current. A target transparency or reflectivity, e.g., a target percentage, may be translated to a target current between particular electrodes.

To establish the particular voltages, or maximum amplitudes for AC, a known dynamic feedback control algorithm may be used, e.g., a closed loop algorithm known from control theory. For example, the controller may repeat the following cycle 1. Translate a target transparency or reflectivity to a target current between electrodes, by interpolating between calibrated currents,
2. Apply a drive signal to electrodes in panel 390, for a time interval
3. Measure current in electrodes using current sensing circuits
4. Compute currents between electrodes, e.g., horizontal and/or vertical current
5. Compare computed currents with a target current, modify the drive signal according to a dynamic feedback algorithm, and go to number 2.

If the above algorithm is applied to currents computed from calibration values, then the above algorithm will cause panel 390 to be driven towards the calibrated state, e.g., fully transparent, fully reflective or fully opaque. However, if the above algorithm is applied to currents that are intermediate between calibrated currents, then the above algorithm will cause panel 390 to be driven towards a state that is intermediate between the calibration states, e.g., intermediate between fully transparent, fully reflective or fully opaque.

The driving signal may be varied along multiple dimensions. A typical choice is voltage, e.g., peak voltage, but other elements that can be varied in addition or instead are duty cycle, bias, waveform shape or AC frequency. For example, using duty cycle may be advantageous for the power consumption of the device. Another example is by using frequency, also the transition time between two intermediate device states may be affected. The driving may also include the subsequent drive of multiple segments to create subsequent electric field orientations.

Driving a panel 390 as in an embodiment will typically apply different driving signals to different electrodes. Accordingly, manufacturing variations in the electrodes are taken into account. For example, given any three electrodes, then the drive signal may be different for them.

In a variation of the above algorithm, the electrodes that are used to compute a target current and drive towards it, is selected from the direction in which the panel is driven, or likely driven. For example, to use $I_{13}$ for vertical drive and $I_{12}$ for horizontal drive, etc. One may even use a computed current, say, I', that is specific for a particular transparency or reflectivity. For example, panel 390 may first be driven towards a desired state using the known calibration states, after which, I' may be computed. In future the I' value may be used for driving. The I' value may be a linear combination of measured currents.

In an embodiment, more than two calibration states are used, e.g., more states than fully dark and fully transparent or fully reflective. This may be done using a transparency or reflectivity sensor. For example, panel 390 may be driven to various states between fully dark and fully transparent, the transparency may be measured with the transparency sensor and currents in the electrodes may be measured. Likewise, in another example, panel 390 may be driven to various states between fully dark and fully reflective, the reflectivity may be measured with the reflectivity sensor and currents in the electrodes may be measured. In an embodiment, a combination of a transparency sensor and a reflectivity sensor is applied. Accordingly, an even more accurate driving can be obtained. For example, one may compute the currents between electrodes at calibrates states and in use drive towards intermediate positions, represented by intermediate currents.

Controller 310 may comprise a target transparency unit 371 configured to set a target transparency. For example, target transparency may be directly set by a user, e.g., 75% grey. The target transparency is derived from a user input and/or sensor signal from a light sensor. For example, target transparency may be computed from a light sensor, e.g., an ambient light sensor possibly together with an external light sensor. The light sensor may be in sensor 391; the light sensing signal may be received at interface 383. Target transparency may be expressed, say, as a percentage between minimal and maximal transparency. Target transparency may be expressed as a target current. Light sensors are optional; for example, target transparency may be directly taken from user input, from a schedule or the like.

If calibration is used, one may have two phases for a light modulator: a calibration phase followed by a use phase. The calibration phase may comprise one or more cycles of driving toward a known state and measuring currents; two or four cycles. The calibration phase may also comprise measuring sensor values. The use phase may comprise multiple cycles of a driving part in which the panel is driven toward a target transparency or reflectivity, and a measuring part in which currents and/or other sensor values are measured. Instead of driving towards a target transparency or reflectivity, the panel may be maintained at a target transparency or reflectivity.

To measure a current in an electrode accurately, controller 310, e.g., controlling unit 370 or driving unit 381 may, temporarily drive all electrodes with a measuring signal. For example, the measuring signal may be the same for different measuring operations. For example, the measuring signal may be a constant signal, and may be the same for all electrodes, or at least for all electrodes connected to the same optical layer.

The measuring signal is applied during a measuring duration. During the measuring duration, the current sensing signals are received. When the measuring duration is over, normal driving of the panel may resume; for example, an electric potential may be applied to the electrodes according to the driving signal.

For example, the measuring signal may be an AC signal, with some particular maximum amplitude. While the measuring signal is being applied, multiple measurement samples may be obtained, e.g., when the measuring signal is at peak amplitude, e.g., peak maximum and/or peak minimum. In this way, multiple samples are obtained, which may be averaged or summed or any other mathematical combination for increased accuracy. As an exemplifying example, the AC signal may be 15 volt, and 10 samples may be taken at +15 volt and 10 samples at −15 volt. These numbers depend on the particular applications and the size of the panel, etc. The number of samples could be more or less, say, a 100 or more or less, the voltage could be different, etc. In an example, the electric potential is a constant AC signal, all electrodes being driven with the constant AC signal simultaneously or consecutively to assess the current during the measuring duration on all electrodes. In another example, the electric potential is varying AC signal, all electrodes being driven with the varying AC signal simultaneously or consecutively to assess the current during the measuring duration on all electrodes. The frequency of the measuring signal could be the same as a frequency used for driving, but is not needed. For example, one could take 100 Hz or 50 Hz, and so on. Again, these are examples. Also for the measuring signal it is preferred that it is DC-neutral to avoid corrosion.

During the measuring the location of the particles may change as a result of the voltages applied to the electrodes. By keeping the measuring duration short and/or the measuring amplitude low, this can be avoided. An advantage of measuring at relatively high frequency, is that multiple samples may be obtained in a short amount of time. For example, less than 50 samples per measurement; for example, measuring frequency of at least 50 Hz.

The peak amplitude during measuring may be lower than during driving. As an example, measuring voltage may be 10 volt, while the driving may be at 20 volt. These are only example values though and depend on many choices, and in particular on the size of the panel. A smaller measuring voltage has the advantage that it will cause less of a disturbance in the particle locations. This is not necessary, as peak amplitude during measuring may be higher than during driving. During maintenance of a target transparency or reflectivity or when nearing the target transparency or reflectivity, driving voltage may be reduced so that measuring amplitude may be relatively higher.

Preferably the measuring duration is quite short, to avoid changing the location of the particles. Also, the current may change during the measurement, which is also avoided by keeping the measuring duration short. How short the measuring duration should be, depends, e.g., on how fast the particles move in the fluid. In an embodiment, measurement duration is less than, say, 100 ms, e.g., preferably less than 20 ms, e.g., 16 ms. Using more advanced current sensing circuits, the current sensing duration may be considerably reduced, e.g., below 1 ms.

The measurement may be repeated after a certain amount of time passed. How often to repeat the measurement depends on the many factors. For example, for an optical layer with high stability, which has achieved its desired transparency or reflectivity, the measurement may be repeated after hours. For a faster optical layer, especially during driving towards a target transparency or reflectivity, the measurements may be repeated more often, e.g., once every 100 ms. In an embodiment, driving or maintaining takes at least 5 times longer than measuring.

Interestingly, after the measuring signal a counter drive signal may be applied to correct for the distortion caused by the measuring. This is not needed, as the normal driving will also correct the location of the particles, but this feature can decrease possible distortion from measuring. For example, if the measuring signal has a lower potential compared to the one currently used to achieve a transparent state at equivalent frequency, after measuring the driving signal potential can be amplified to compensate for the lower measurement signal applied before.

In the use-phase, the controller is configured to measure the current in the electrodes periodically. The frequency of measuring depends on the application, whether the panel has reached a desired target transparency or reflectivity and is kept at this state or is actively driven towards the target transparency or reflectivity. For example, measuring could be once every 100 ms, once every second. However, for a slow optical layer and a panel that is being maintained, the measuring may be much less frequent, e.g., at little as once an hour.

When the target transparency or reflectivity of the light modulator is reached or is within a threshold of the target transparency or reflectivity, the controlling unit may reduce an amplitude or duty cycle of the electric potential applied to the electrodes, and/or change a current measuring periodicity. For example, measuring periodicity may temporarily be increased while the energy in the driving is reduced, e.g., when nearing the target. This has the advantage of reducing overshoot.

Various additional sensors 391 may be installed on, in or near panel 390. For example, one or more temperature sensors may be configured to measure at least one of an outside temperature, inside temperature, and a fluid temperature in the optical layer.

If the optical layer is warmer, the particles will move faster. Controlling unit 370 may adapt in various ways. For example, measuring the current may be done more often, as panel 390 is likely to react quicker to changes in the driving signal. Likewise, if the temperature increases the driving frequency may increase. In an embodiment, closing the panel uses a lower AC frequency than opening the panel. The slower frequency may be increased if the temperature increases. Since the risk of corrosion damage in the electrode increases with temperature a more balanced driving is important, which is achieved with a higher frequency. The relation between temperature and measuring or driving frequency may be a function, or a look-up table, etc.

Figure 4A:
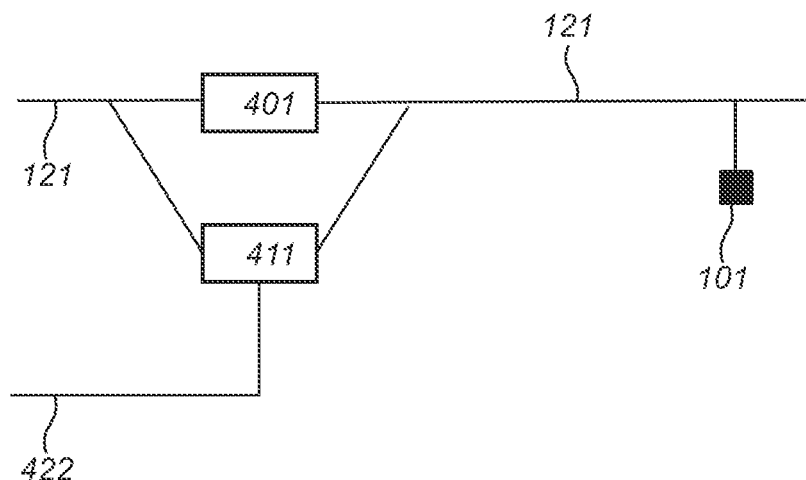

FIG. 4a schematically shows an example of an embodiment of a current sensing circuit 411. Shown is the driving line 121 of electrode 101. A resistor 401 is included into driving line 121. A current sensing circuit 411 measures the voltage drop over resistor 401 as an indicator of current through resistor 401. A current signal 422 is transmitted to a controller, e.g., controller 150, or controller 310, etc.

Figure 4B:
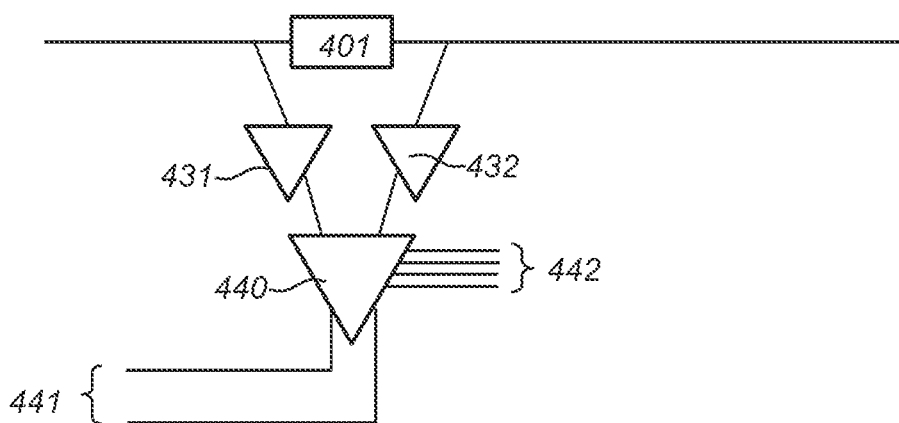

FIG. 4b schematically shows an example of an embodiment of a current sensing circuit. Shown are buffers 431 and 432 connected on one end to either side of resistor 401 and on the other to the input of a programmable gain amplifier 440. The buffers may be precision rail-to-rail input output op amps, preferably with a low current bias.

Programmable gain amplifier 440 is configured to receive a gain signal 442; in this case in the form of four bits, giving 16 different gain settings. Programmable gain amplifier 440 produces as output a current signal, e.g., the voltage drop over resistor 401 as output 441. In this case, output 441 is a differential output—the difference between the output signal indicating current through resistor 401, this is not necessary, though convenient. The current signal 441 may be transmitted to the controller.

In an embodiment, the current sensing circuit can measure the current in a wide range, e.g., between 10 nA and 100 mA. This is useful, say, if the controller is used for different types of panels. Different panel types and sizes have different currents. Moreover, as pointed out some of the currents can be become very small, during driving. This can overcome by switching to other currents between other electrodes, but is also alleviated by a programmable gain. Gain may be used to configure a controller for a different panel. Advantageously, the same hardware may be reconfigured for a different type of panel.

The output 441 may be a voltage difference. For example, current can be computed from the voltage difference, the resistor value R, the gain, and a voltage reference Vref. For example, in an embodiment I=(Output Voltage difference)/(R*GAIN*Vref). The reference voltage may be related to a reference voltage of an analog-to-digital converter (ADC) of the controller.

Figure 5A:
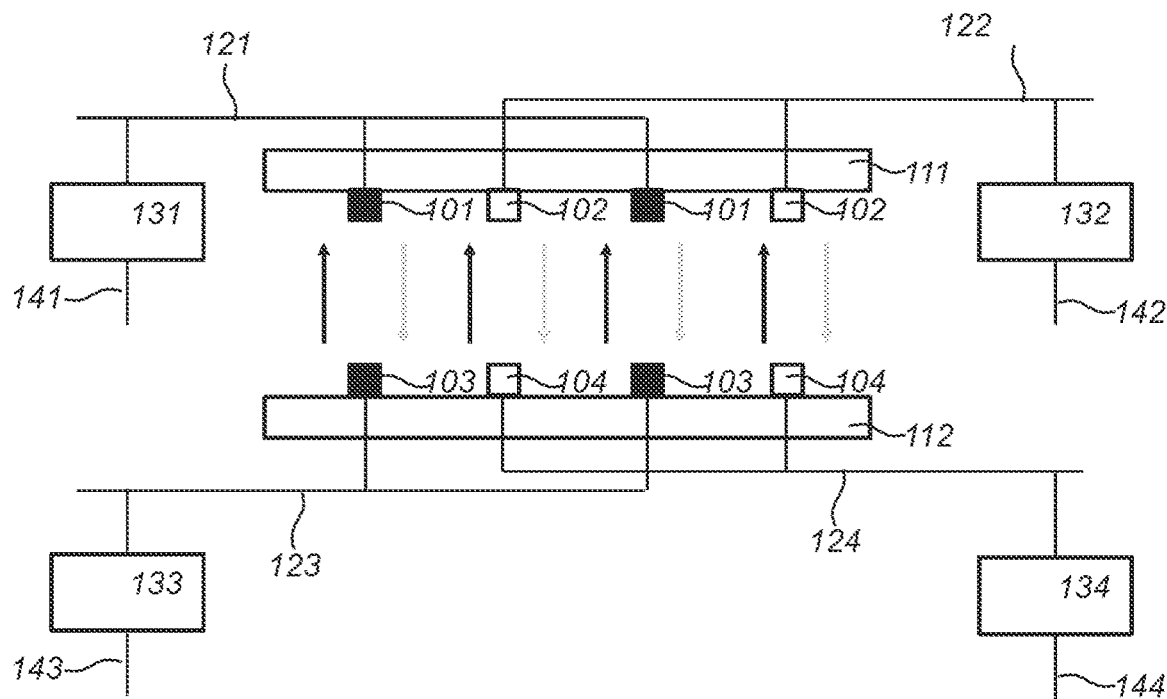
Figure 5B:
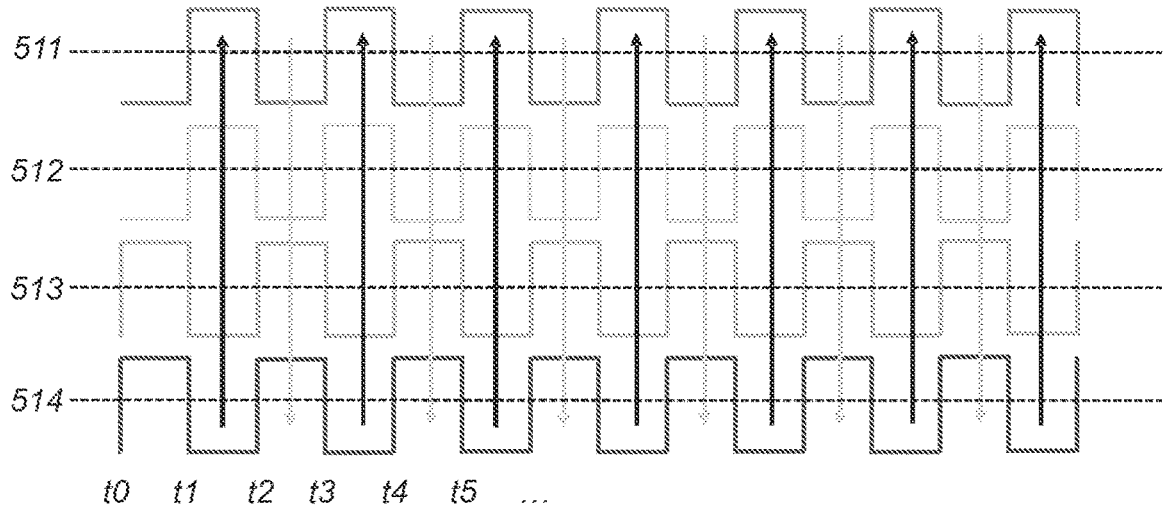
Figure 5C:
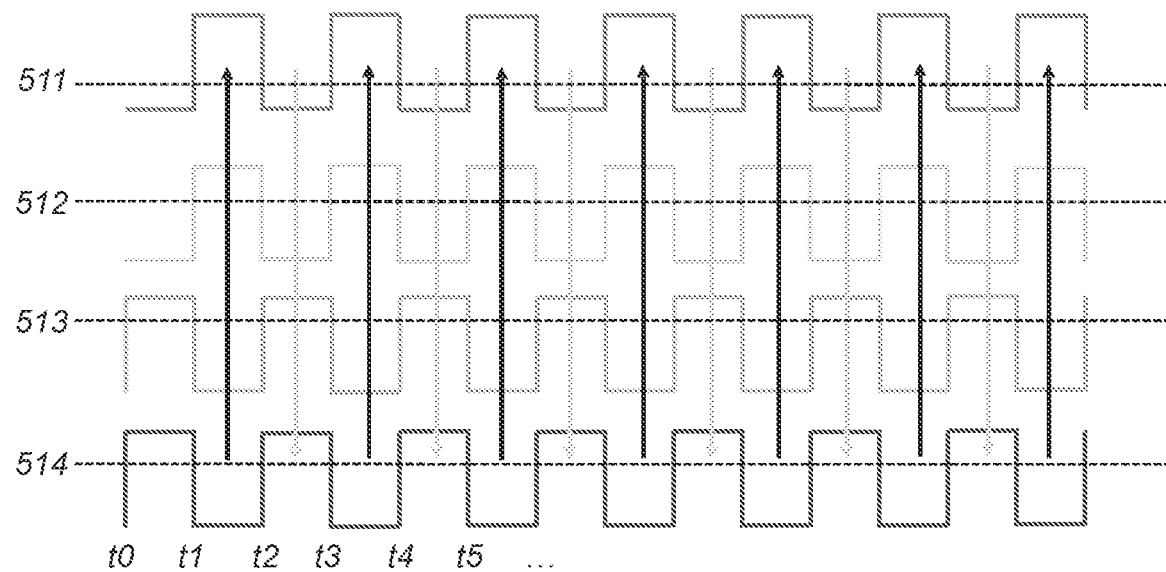

FIGS. 5a, 5b and 5c schematically show an example of an embodiment of opening a light modulator. Shown in FIGS. 5b and 5c are the driving signals; driving signal 511-514 correspond to electrodes 101-104. Shown in FIG. 5a are the field lines according to which the particles move. With AC driving the particles in the liquid of the optical layer will bounce between the 2 substrates.

Figure 6A:
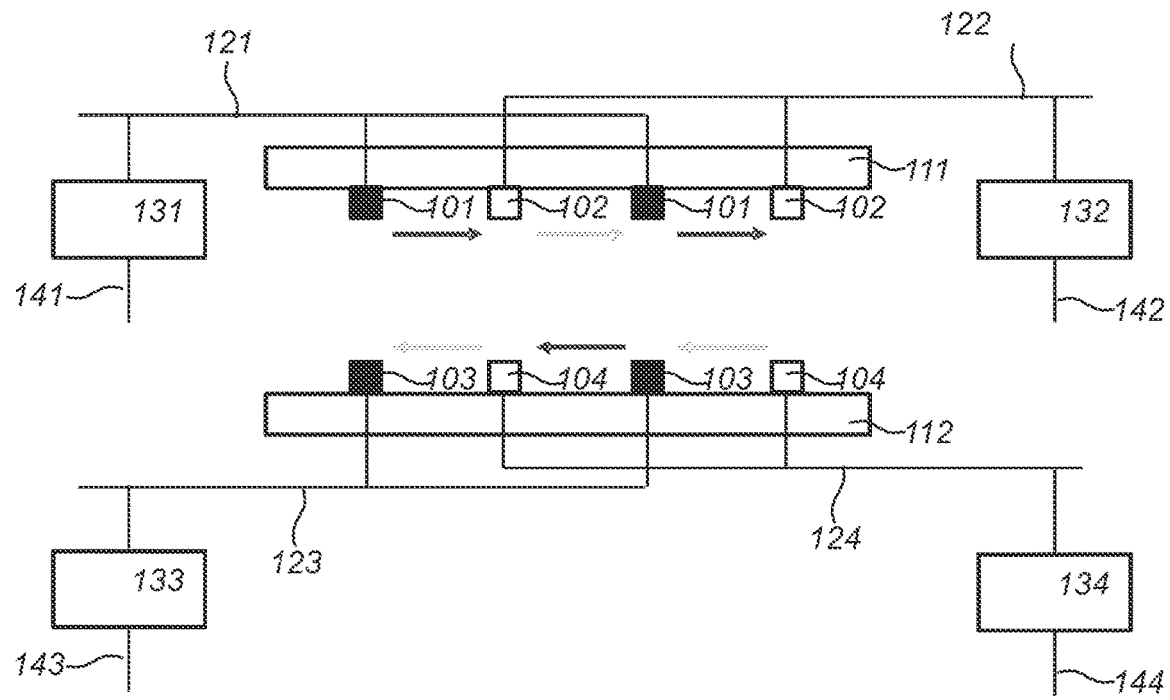
Figure 6B:
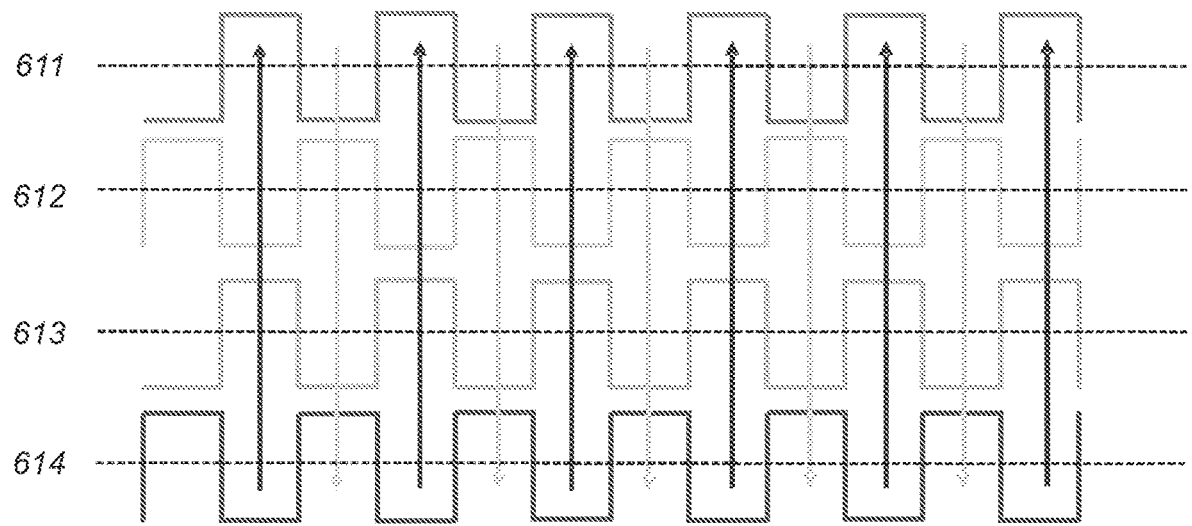

FIGS. 6a and 6b schematically show an example of an embodiment of closing a light modulator. Shown in FIG. 6b are the driving signals; driving signal 611-614 correspond to electrodes 101-104. Shown in FIG. 6a are the field lines according to which the particles move. With AC driving the particles in the liquid of the optical layer will bounce between the two electrodes on the same substrate.

In the situation shown in FIGS. 5b and 6b, all maximum amplitudes for all electrodes are equal. In an embodiment, some signals will have a somewhat higher amplitude, while some may have a somewhat lower amplitude, an example of which is shown in FIG. 5c. Moreover, the driving signals will change over time, e.g., as parameters such as light, temperature or target transparency or reflectivity changes. Moreover, the driving signals may also change when the panel has reached a particular target transparency or reflectivity and only needs to maintain it.

FIG. 7 schematically shows an example of an embodiment of a method 700 of controlling a light modulator.

In part 710 the system is calibrated. For example, calibration may be done when the system is turned on for the first time, not used for a long time or the system detects out of range values. For example, a measured current outside the range seen during calibration. In part 720 the current is measured for each electrode that is in the light modulator panel.

In part 730 inner and outer light levels are measured, e.g., using an inverse logarithmic scale to define the target transparency of the light modulator panel; for example, light sensors may be applied on both sides of the panel. For example, for a window with smart glazing, light levels may be measured inside the room and light levels outside the room, outside the window.

In addition to light levels, a temperature sensor may measure the outside temperature, the inside temperature and/or the liquid temperature inside the panel.

The temperature of the liquid, can have an impact on the performance of the panel. For example, the driving frequency and the current measurement interval may change. The current measurement interval is an amount of time after which the current measurements in part 720 are repeated.

In part 740 the output towards the light modulator panel is computed from the measured currents, light levels and temperatures. For example, a gray scale table may be defined that the controller can use to define the panel. These can be used as setpoints for a feedback algorithm. The table can also be used as a selection table that a user can select, e.g., with a device that is connected to the system. The user device may be wired or wireless, e.g., a button, a mobile phone, etc. In part 750 the electrodes are drive according to the computed output.

Typically, a drive signal is computed for each electrode of the panel. Moreover, different target transparencies or reflectivities or transition between different transparencies or reflectivities may have a different driving signal. The driving signal may differ in voltage, frequency, duty cycle for each of the electrodes, to drive toward the target transparency or reflectivity.

In part 760, it may be detected that new input is received, e.g., a new target transparency, or desired ambient light level from a user, or new sensor values, e.g., from light or temperature sensors. In part 770 it is determined if a new calibration is needed, or preferred, e.g., out of range values are detected. Out of range values could be a large temperature change, say, over a threshold, a target transparency or reflectivity level not reached in time, etc.

If the panel is not driven, the system can go to a sleep mode. The embodiment of FIG. 7 is an example, and can be varied in many ways, as also pointed out herein. For example, the use of light sensor or the use of temperature sensors is optional. For example, instead of AC signals, balanced DC driving may be used, etc.

FIG. 8 schematically shows an example of an embodiment of a controlling method 800 for a light modulator panel. Controlling 800 comprises Calibrating 810 comprising measuring current in the electrodes in one more known states of the panel. Calibrating 810 may comprise determining additional parameters, for example, determining the maximum and minimum values of the panel performance, positive, negative and reference voltages, temperature offset, light offset, grayscale selection offset, user input offset, etc. Calibrating can be done in factory before use, but can also or instead be done in the field at the customer. Calibration can be repeated, in whole or in part, when the system is turned on, rebooted, reset, timed-out, periodically, etc.

Obtaining sensor values 820. For example, obtaining sensor values may comprise obtaining outside temperature, room temperature and inside optical layer temperature. The temperature of the optical layer has an impact on the status of the panel. Measuring the temperature of the optical layer allows the control algorithm to react to temperature. Sensor values may also include outside ambient light and room ambient light. For example, this may be used to keep room ambient light stable.

Setting a target transparency 830. Target transparency may be computed from a room ambient light level. It may also be directly set by a user through a user interface.

Driving the panel 840. The panel may be driven for some time. In the first iteration, this may be an initial driving signal. The initial driving signal may be a default driving signal. The initial driving signal may depend on a computed actual transparency level.

Measuring current 850. After driving for some time, the currents in the electrode may be measured. This may comprise setting a measuring signal on the electrodes. Measuring current 850 may be interchanged with driving 840.

Adapting the driving signal 860. A driving algorithm, e.g., a control algorithm such as a closed loop feedback algorithm may modify the driving signal so that the measured current of part 850 will converge towards currents computed to correspond to the target transparency. The computed current can be obtained by interpolating current measured during calibration.

An exemplary embodiment of a light modulator is shown below.

Figure 9A:
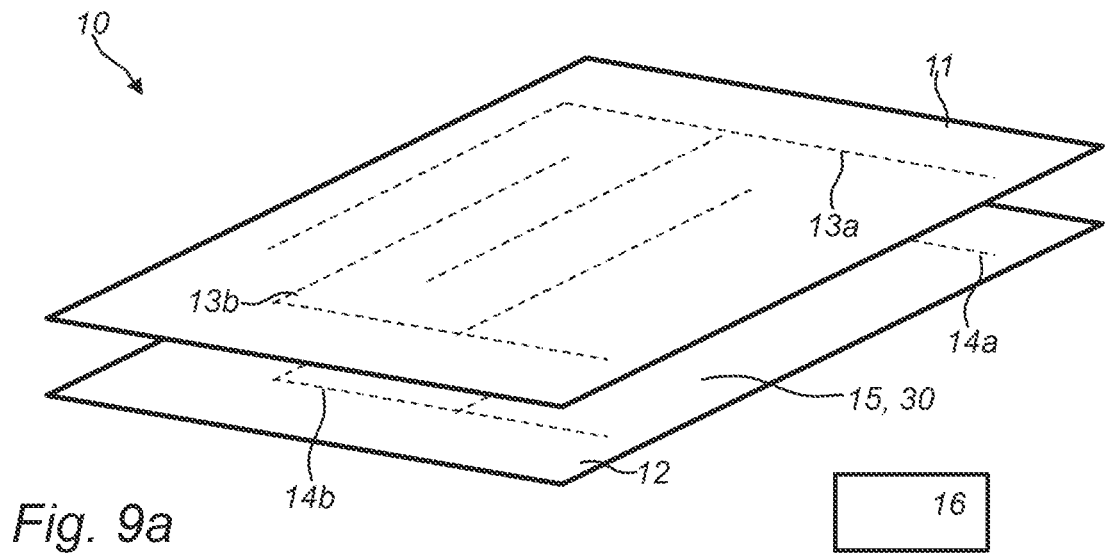

FIG. 9a schematically shows an embodiment of a light modulator 10, which may be applied in smart glazing.

Reference is made to patent application PCT/EP2020/052379, which is incorporated herein by reference; this application comprises advantageous designs for a light modulator, which may be further improved, e.g., by including electrodes and/or branches as explained herein.

Light modulator 10 can be switched electronically between a transparent state and a non-transparent state and vice versa, or between a reflective state and a non-reflective state and vice versa. Light modulator 10 comprises a first substrate 11 and a second substrate 12 arranged opposite to each other. On an inner-side of first substrate 11 at least two electrodes are applied: shown are electrodes 13a, 13b. These at least two electrodes are together referred to as electrodes 13. On an inner-side of second substrate 12 at least two electrodes are applied: shown are electrodes 14a, 14b. These at least two electrodes are together referred to as electrodes 14. Current sensing circuits may be installed in electrodes 13a and 13b and 14a and 14b

A fluid 15 is provided in between the substrates. The fluid comprises particles 30, e.g., nanoparticles and/or microparticles, wherein the particles are electrically charged or chargeable. The electrodes are arranged for driving particles 30 to move towards or away from electrodes, depending on the electric field applied. The optical properties, in particular the transparency of the light modulator depends on the location of particles 30 in the fluid. For example, a connection may be provided for applying an electro-magnetic field to the electrodes. A controller 16 is shown configured to receive the currents sensing signals and to generator driving signals for the electrodes 13 and 14.

In an example, substrate 11 and substrate 12 may be optically transparent, outside of the electrodes, typically >95% transparent at relevant wavelengths, such as >99% transparent. The term "optical" may relate to wavelengths visible to a human eye (about 380 nm-about 750 nm), where applicable, and may relate to a broader range of wavelengths, including infrared (about 750 nm-1 µm) and ultraviolet (about 10 nm-380 nm), and sub-selections thereof, where applicable. In an exemplary embodiment of the light modulator a substrate material is selected from glass and polymer.

In another example, one substrate, such as a bottom substrate 12, may be reflective or partially reflective, while the top substrate 11 is transparent. The optical properties, in particular the reflectivity of the light modulator depends on the location of particles 30 in the fluid. When the panel is in the open state (vertical drive), the particles will mostly be located between opposite electrodes of the two substrates, such that incident light can pass through the transparent top substrate and the optical layer relatively unhindered, and is reflected or partially reflected on the bottom substrate.

The distance between the first and second substrate is typically smaller than 30 µm, such as 15 µm. In an exemplary embodiment of the light modulator a distance between the first and second substrate is smaller than 500 µm, preferably smaller than 200 µm, preferably less than 100 µm, even more preferably less than 50 µm, such as less than 30 µm.

In an example the modulator may be provided in a flexible polymer, and the remainder of the device may be provided in glass. The glass may be rigid glass or flexible glass. If required, a protection layer may be provided on the substrate. If more than one color is provided, more than one layer of flexible polymer may be provided. The polymer may be polyethylene naphthalate (PEN), polyethylene terephthalate (PET) (optionally having a SiN layer), polyethylene (PE), etc. In a further example the device may be provided in at least one flexible polymer. As such the modulator may be attached to any surface, such as by using an adhesive.

Particles 30 may be adapted to absorb light and therewith preventing certain wavelengths from passing through. Particles 30 may reflect light; for example, the reflecting may be specular, diffusive or in between. A particle may absorb some wavelengths, and reflect others.

In an exemplary embodiment of the light modulator a size of the nanoparticles is from 20-1000 nm, preferably 20-300 nm, more preferably smaller than 200 nm. In an exemplary embodiment of the light modulator the nanoparticles/microparticles may comprise a coating on a pigment, and preferably comprising a core. In an exemplary embodiment of the light modulator the coating of the particles is made from a material selected from conducting and semi-conducting materials.

In an exemplary embodiment of the light modulator the particles are adapted to absorb light with a wavelength of 10 nm-1 mm, such as 400-800 nm, 700 nm-1 µm, and 10-400 nm, and/or are adapted to absorb a part of the light with a wavelength-range falling within 10 nm-1 mm (filter), and combinations thereof.

In an exemplary embodiment of the light modulator the particles are electrically charged or chargeable. For example, a charge on the particles may be 0.1e to 10e per particle ($5*10^{-7}$-0.1 C/m2). Suitable examples of such particles are provided, for example, in U.S. Pat. No. 4,680,103 A, which is incorporated herein by reference.

In an exemplary embodiment of the light modulator the fluid is present in an amount of 1-1000 g/m2, preferably 2-75 g/m2, more preferably 20-50 g/m2, such as 30-40 g/m2. It is a big advantage that with the present layout much less fluid, and likewise particles, can be used.

In an exemplary embodiment of the light modulator the particles are present in an amount of 0.01-70 g/m2, preferably 0.02-10 g/m2, such as 0.1-3 g/m2.

In an exemplary embodiment of the light modulator the particles have a color selected from cyan, magenta, and yellow, and from black and white, and combinations thereof.

In an exemplary embodiment of the light modulator the fluid comprises one or more of a surfactant, an emulsifier, a polar compound, and a compound capable of forming a hydrogen bond.

Fluid 15 may be an apolar fluid with a dielectric constant less than 15. In an exemplary embodiment of the light modulator the fluid has a relative permittivity sr of less than 100, preferably less than 10, such as less than 5. In an exemplary embodiment of the light modulator, fluid 15 has a dynamic viscosity of above 10 mPa·s.

Electrodes 13a, 13b and electrodes 14a, 14b are in fluidic contact with the fluid. The fluid may be in direct contact the electrodes, or indirectly, e.g., the fluid may contact a second medium with the electrode, such as through a porous layer. In an embodiment, the electrodes cover about 1-30% of the substrate surface. In an embodiment, the electrodes comprise an electrically conducting material with a sheet resistance of less than 10000 Ohms per square (Ω/sq), preferable less than 100 Ω/sq, more preferably less than 10 Ω/sq. In an embodiment of the light modulator one or more of the electrodes comprise one or more metals selected from copper, silver, gold, aluminum, graphene, titanium, indium, preferably copper. The electrodes may be in the form of micro-wires embedded in a polymer-based substrate; for example, copper micro-wires.

A connection for applying an electro-magnetic field to the electrodes, wherein the applied electro-magnetic field to the electrodes provides movement of the nano- and microparticles from a first electrode to a second electrode and vice versa, A connection for applying an electro-magnetic field to the electrodes may be provided. For example, in an exemplary embodiment of the light modulator an electrical current is between −100-+100 µA, preferably −30-+30 µA, more preferably −25-+25 µA. For example, a power provider may be in electrical connection with the at least two electrodes. The power provider may be adapted to provide a waveform power. At least one of amplitude, frequency, and phase may be adaptable to provide different states in the light modulator. For example, the aspects of the power may be adapted by a controller.

Light modulator 10 may comprise one or more pixels, typically a multitude of pixels, the pixel being a single optically switchable entity, which may vary in size. The substrates enclose a volume, which may be a pixel, at least partly. The present design allows for stacking to allow for more colors; e.g., for full color applications a stack of two or three modulators could provide most or all colors, respectively. The present device may comprise a driver circuit for changing appearance of (individual) pixels by applying an electro-magnetic field. As such also the appearance of the light modulator, or one or more parts thereof, may be changed.

In an exemplary embodiment of the light modulator, the light modulator comprises less than a pixel per mm2. Having one or more pixels allows the light modulator to be controlled locally; this is advantageous for some applications, but not necessary. For smart glazing a light modulator may be used with or without pixels. For example, applied in smart glazing, transparency or reflectivity may be controlled locally, e.g., to block a sun-patch without reducing transparency or reflectivity in the whole window.

In an exemplary embodiment of the light modulator substrates (11,12) are aligned, and/or electrodes (13,14) are aligned. For example, electrodes 13a, 13b and electrodes 14a, 14b may be aligned to be opposite each other. In aligned substrates, electrodes on different substrates fall behind each other when viewed in a direction orthogonal to the substrates. When the light modulator is disassembled, and the substrates are both arranged with electrodes face-up, then the electrode patterns are each other's mirror image.

Aligning substrates may increase the maximum transparency or reflectivity of the light modulator, on the other hand when selecting a light modulator for more criteria than the range of transparency or reflectivity, etc., it may be better to not to align or not fully align the two substrates. Light modulators can be stacked. For example, two stacked light modulators can be made from three substrates, wherein the middles one has electrodes on both its surfaces. In an embodiment of the light modulator optionally at least one substrate 11,12 of a first light modulator is the same as a substrate 11,12 of at least one second light modulator. Also, for stacked modulators, alignment may increase maximum transparency or reflectivity, but is may detrimental to other considerations, e.g., diffractions.

Figure 9B:
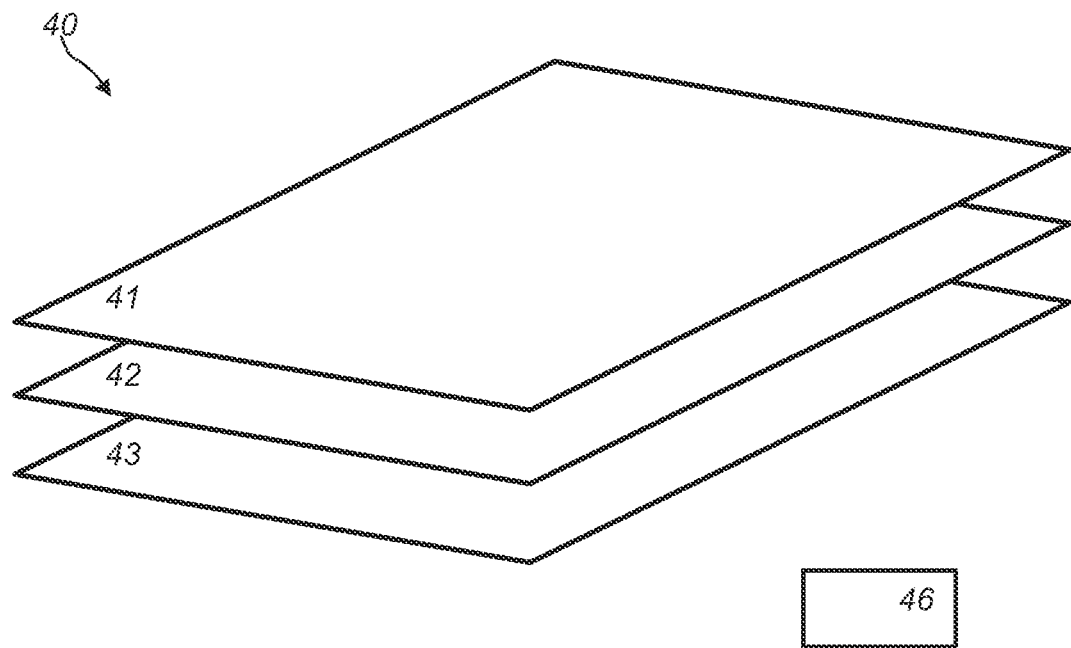

FIG. 9b schematically shows an example of an embodiment of a light modulator 40. Light modulator 40 is similar to light modulator 10, except that it comprises multiple optical layers; in the example as shown two optical layers. There may be more than two optical layers. Each optical layer is arranged between two substrates. Light modulator 40 can be regarded as a stack of two-substrate light modulators as in FIG. 9a. As shown, light modulator 40 comprises three substrates: first substrate 41, second substrate 42 and third substrate 43. Between substrates 41 and 42 is an optical layer, and between substrates 42 and 43 is an optical layer. The optical layers may be similar to those in light modulator 10. A controller 46 is configured to control electrical current on the electrodes of the substrates. For example, in FIG. 9b, controller 46 may be electrically connected to at least 4 times 2 equals 8 electrodes.

Interestingly, the particles in the multiple optical layers may be different so that the multiple layers may be used to control more optical properties of the light modulator. For example, particles in different optical layers may absorb or reflect at different wavelengths, e.g., may have a different color. This can be used to create different colors and/or different color intensities on the panel by controller 46. For example, a four-substrate panel may have three optical layers with differ color particles, e.g., cyan, yellow, and magenta respectively. By controlling the transparency or reflectivity for the different colors a wide color spectrum may be created.

The surfaces of the substrates that face another substrate may be supplied with two or more patterns, e.g., as in an embodiment. For example, the outer substrates 41 and 43 may receive electrodes only on an inner side, while the inner substrate, e.g., substrate 42, may have electrodes on both sides.

Substrates 41 and 42 may together be regarded as an embodiment of a light modulator. Likewise, substrates 42 and 43 may together be regarded as an embodiment of a light modulator.

Figure 9C:
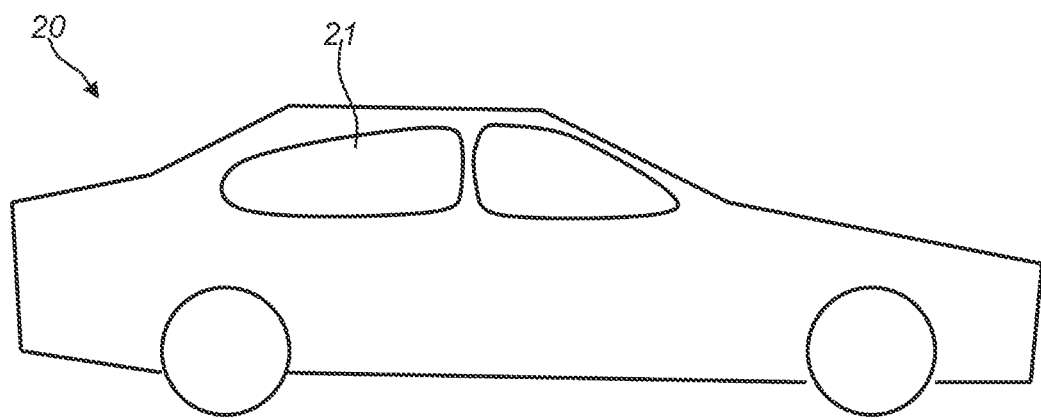

FIG. 9c schematically shows an example of an embodiment of a car 20 having smart glazing for windows 21. This is a particularly advantageous embodiment, since while driving the level of incident lighting can change often and rapidly. Using smart glazing in a car has the advantage that light levels can be maintained as a constant level by adjusting the transparency of the car windows. Moreover, the improved driving improves safety since the car windows obtain a more accurate transparency. For example, when windows are darkened, they are less likely to be darkened too much, or vice versa. Car 20 may comprise a controller configured for controlling the transparency of windows 21.

The smart glazing can also be used in other glazing applications, especially, were the amount of incident light is variable, e.g., buildings, offices, houses, green houses, skylights. Skylights are windows arranged in the ceiling to allow sunlight to enter the room.

Figure 10A:
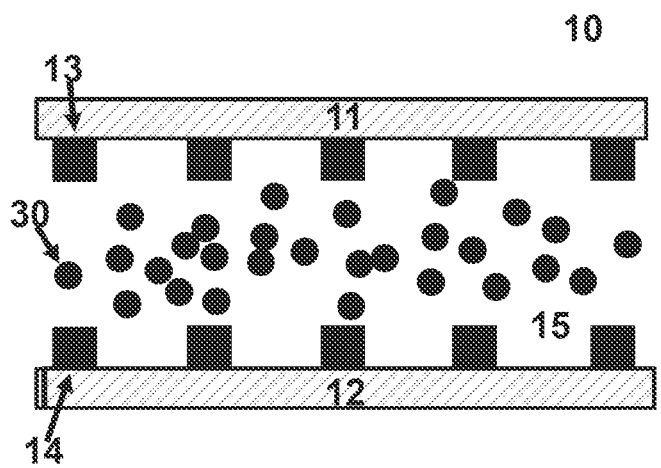
Figure 10B:
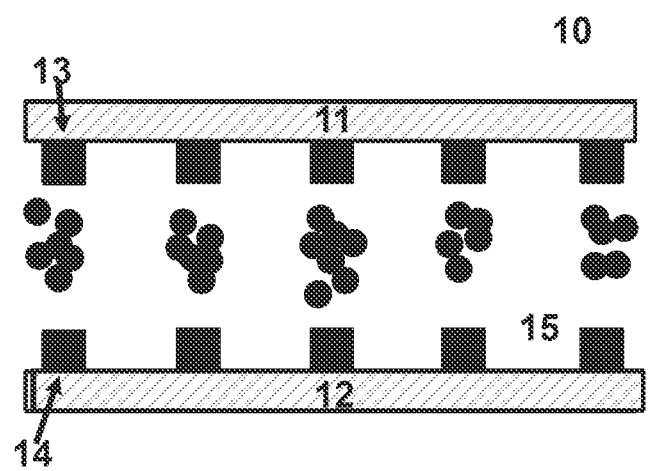

FIGS. 10a-10b schematically show a side view of an embodiment of a light modulator in use. Applying an electric field to the electrodes on the substrates causes an electrical force on the particles. Using this effect, the particles can be moved around and so different transparency or reflectivity states can be caused in the light modulator. A controller may control the electric field, e.g., its amplitude, frequency, and phase. In an embodiment, the controller is connected to at least four electrodes: two for each substrate. But more electrodes may be used and connected to the controller; for example, more than 2 electrodes may be used for a substrate to enable more control of grey levels or obtaining specific optical patterns.

FIG. 10a shows the light modulator without an electric field being applied. No electric force is yet applied on particles 30 suspended in fluid 15, in FIG. 10a.

In the configuration shown in FIG. 10a, a conducting electrode pattern arranged on the top substrate is completely or substantially aligned with a conducting electrode pattern on the bottom substrate such that the required electrode configuration is obtained. The conducting electrode pattern may be deposited on a transparent, reflective or partially reflective substrate, or may be embedded in a plastic substrate, etc.

Alignment between the top-electrode pattern and the bottom electrode pattern contributes to a wider range of achievable levels of transparency or reflectivity. However, alignment is not needed, as similar effects can be obtained without alignment. Without alignment, a range of transparency or reflectivity is likewise obtained.

Note that in these examples, reference is made to the top substrate and the bottom substrate to refer to substrate that is higher or lower on the page. The same substrates could also be referred to, e.g., as the front substrate and back substrate, since in a glazing application, the substrates would be aligned vertically rather than horizontally.

FIG. 10b shows the light modulator wherein, say at an instance P1, a potential +V1 is applied to each electrode on the top substrate, while a negative voltage, say −V1, is applied to each electrode of the bottom substrate. Thus, in this case, the same positive potential is applied to all electrodes 13, and the same negative potential is applied to electrodes 14. The difference in potential causes negatively charged particles to flow to the vicinity of the electrodes of the top substrate, where those particles will substantially align with the top electrodes. If the solution contains positively charged particles they will flow to the vicinity of the electrodes of the bottom substrate, where those particles will substantially align with the bottom electrodes. As a result, if both the top and bottom substrate are transparent, the transparency of light modulator 10 will increase. Likewise, if e.g. the top substrate is transparent and the bottom substrate is reflective, the reflectivity of light modulator 10 will increase. A similar transparency or reflectivity can be achieved, when in a second instance, P2, of the on-state, the voltages of the top electrode and bottom electrode are reversed in contrast to the instance of P1. In the instance P2, the voltage of each electrode on of the top substrate are now supplied with a negative potential −V1 while the voltages of the aligned electrode of the bottom substrate are supplied with a positive potential. This state is similar to the state shown in FIG. 10b, but with top and bottom substrates reversed. Also, in this configuration the transparency or reflectivity of light modulator 10 is high.

Similarly addressing electrodes 13 and 14, in case of high temporal change from P1 to P2 and so on (AC signal), the particles will align within the electric field lines between the electrodes (without necessary reaching the electrodes location). As a result, if both the top and bottom substrate are transparent, the transparency of light modulator 10 will increase. Likewise, if e.g. the top substrate is transparent and the bottom substrate is reflective, the reflectivity of light modulator 10 will increase.

Interestingly, by switching consecutively between a positive potential at electrodes at the top substrate, e.g., as shown as electrodes 13 in FIG. 10b (and a negative potential on electrodes 14), and a positive potential at electrodes at the bottom substrate (and a negative potential on electrodes 13), e.g., as shown as electrodes 14 in FIG. 10b, the transparency or reflectivity can be maintained, while decreasing corrosion damage to the electrodes. This alternating electric field can be achieved by applying alternating electric potentials to the top and bottom electrodes.

Applying a waveform is optional, but it is a useful measure to increase the lifetime of the light modulator by reducing corrosion. Corrosion can form for example, when using copper electrodes, since, copper ions dissolve in an ionic fluid at one substrate and flow to copper electrode on the opposite substrate, where they deposit. By applying a waveform, the direction of copper ion transport is frequently reversed, thus reducing corrosion damage. Between the two instances P1 and P2 the corrosion current between the two substrates is balanced or substantially, e.g., >95%, balanced, e.g., as corrosion rate of an electrode of the top plate occurs there is a balancing deposition of copper on the bottom electrode between each instance of time, P1 and vice versa in instance P2. Therefore, the particles are transitioning or migrating continuously between top and bottom electrode, and the light modulator or smart window is always in the on-state while the dynamic electrolysis current between the top and bottom electrode is constant thus there is no or a negligible net loss of copper electrode material on the top and bottom substrates.

Figure 10C:
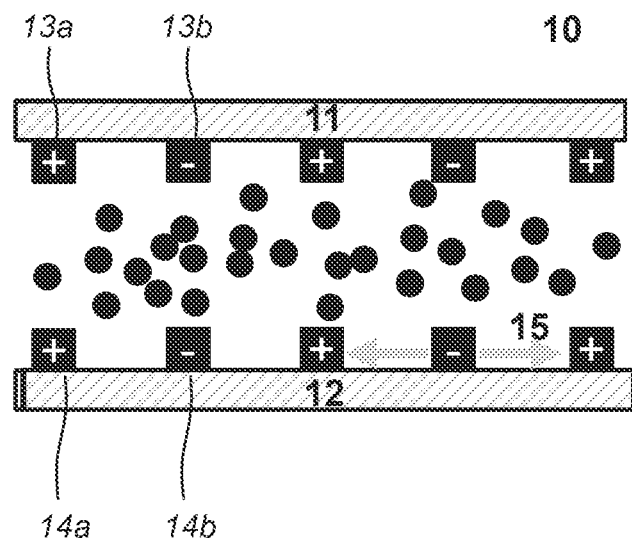

FIG. 10c shows how a state of decreased transparency or reflectivity can be obtained. An alternating voltage is applied on the same substrate. For example, in an embodiment a potential +V2 is applied a first electrode and the next immediate neighboring electrode has an opposite potential −V2 etc., as shown in FIG. 10c. This can be obtained by applying the potential +V2 to electrode 13a and the opposite potential −V2 to electrode 13b. On the opposite substrate the potential +V2 may be applied to electrode 14a and the opposite potential −V2 to electrode 14b. For example, the electrodes may be arranged so that the electrodes on the substrates are aligned; an electrode on the top substrate having an opposite electrode on the bottom substrate, and vice versa. For example, to decrease transparency or reflectivity, the opposite electrode may receive the same potential, while neighboring electrodes receive an opposite potential. An embodiment is shown in FIG. 10c, wherein four electrodes are indicated with the reference numbers 13a, 13b, 14a and 14b, and the rest of the electrodes continue to alternate.

By using this AC drive cycle between top and bottom substrates, diagonal and lateral electric fields are generated between the two substrates thereby causing haphazard diffusion of the particles thereby creating the closed state of the light modulator. As a result of this configuration, the particles migrate diagonally and laterally between the top and bottom substrate and diffusion of particles into the visible aperture of the light modulator contributes to the closed, opaque state of the light modulator.

As for the transparent state shown in FIG. 10b, a waveform may be applied to the electrodes, e.g., so that electrodes that are shown in FIG. 10b with a positive potential become negative and vice versa. As in FIG. 10b applying a waveform, e.g., between electrodes 13a and 13b and between 14a and 14b reduces corrosion damage to the electrodes.

The AC drive cycle may be implemented by using an interdigitated line configuration, e.g., combining the top and bottom electrode configuration shown in plan view in FIG. 2a or 2b The extent to which transparency or reflectivity is increased or decreased in FIGS. 10b and 10c depends on the electrical signal amplitudes (voltages), frequencies and bias differences. By varying the amplitude difference, the amount by which the transparency or reflectivity increases, respectively, decreases, is controlled. For example, a curve representing light transmission versus voltage may be determined, e.g., measured. To obtain a particular level of light transmission, e.g., a particular transparency, e.g., a particular grey-scale level, the corresponding voltage, e.g., AC voltage may be applied. By interpolating the signals for a transparent or for a non-transparent state, levels in between transparent and non-transparent may be obtained. Likewise, a curve representing light reflection versus voltage may be determined, e.g., measured. To obtain a particular level of reflectivity, the corresponding voltage, e.g., AC voltage may be applied. By interpolating the signals for a reflective or for a non-reflective state, levels in between reflective and non-reflective may be obtained.

Figure 11:
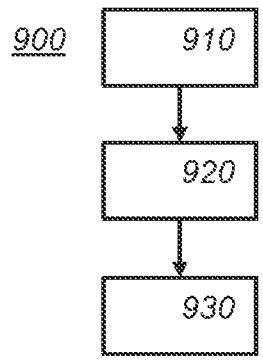

FIG. 11 schematically shows an example of an embodiment of a method 900 of controlling a light modulator according to an embodiment. The method may be computer implemented. The method comprises receiving (910) at least one current sensing signal from the at least one current sensing circuits indicating current in a corresponding electrode, determining (920) driving signals for the electrodes from the at least one current sensing signals and from a target transparency, transmitting (930) the driving signal to the light modulator for applying an electric potential to the multiple electrodes according to the driving signal to obtain an electro-magnetic field between the multiple electrodes, wherein the electro-magnetic field provides electrophoretic movement of the particles towards or from one of the multiple electrodes.

Many different ways of executing the method are possible, as will be apparent to a person skilled in the art. For example, the order of the steps can be performed in the shown order, but the order of the steps can be varied or some steps may be executed in parallel. Moreover, in between steps other method steps may be inserted. The inserted steps may represent refinements of the method such as described herein, or may be unrelated to the method. For example, some steps may be executed, at least partially, in parallel. Moreover, a given step may not have finished completely before a next step is started.

Embodiments of the method may be executed using software, which comprises instructions for causing a processor system to perform method 900. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the presently disclosed subject matter also extends to computer programs, particularly computer programs on or in a carrier, adapted for putting the presently disclosed subject matter into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the devices, units and/or parts of at least one of the systems and/or products set forth.

Figure 12A:
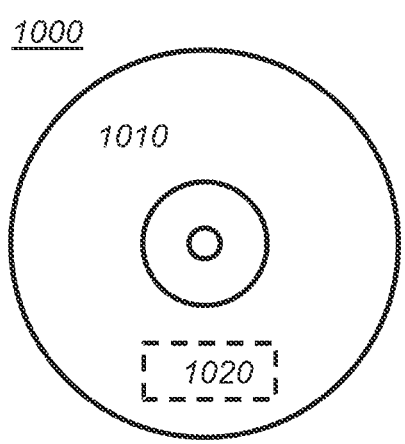

FIG. 12a shows a computer readable medium 1000 having a writable part 1010 comprising a computer program 1020, the computer program 1020 comprising instructions for causing a processor system to perform a light modulator method, according to an embodiment. The computer program 1020 may be embodied on the computer readable medium 1000 as physical marks or by magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform the light modulator method.

Figure 12B:
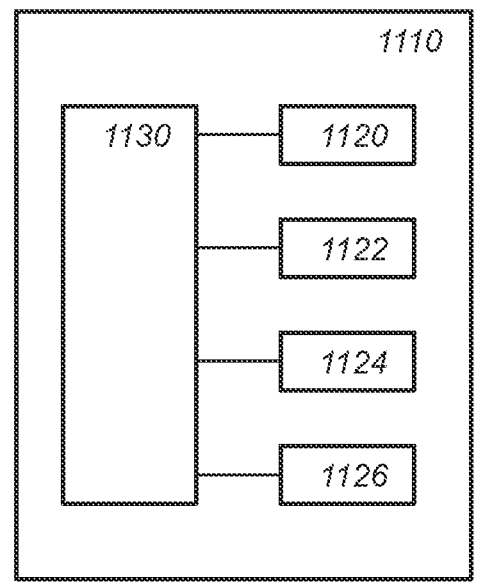

FIG. 12b shows in a schematic representation of a processor system 1140 according to an embodiment of a controller for a light modulator. The processor system comprises one or more integrated circuits 1110. The architecture of the one or more integrated circuits 1110 is schematically shown in FIG. 12b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., the device may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

A controller for a light modulator, e.g., to control voltages applied to electrodes may comprise a processor circuit, but may also or instead comprise a state machine.

It should be noted that the above-mentioned embodiments illustrate rather than limit the presently disclosed subject matter, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The presently disclosed subject matter may be implemented by hardware comprising several distinct elements, and by a suitably programmed computer. In the device claim enumerating several parts, several of these parts may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A light modulator comprising:
a first substrate and a second substrate, the first and second substrates being arranged with inner sides opposite to each other, multiple electrodes being applied to the inner side of the first substrate and multiple electrodes being applied to the inner side of the second substrate, each of the multiple electrodes on the first and second substrates being arranged in a pattern across the substrate, the multiple electrodes each comprising:
a multiple of main-lines extending across the substrate in a first direction, the multiple of main-lines of the multiple electrodes being arranged alternatingly with respect to each other on the substrate;
an optical layer between at least the first and second substrate, the optical layer comprising
a fluid comprising particles, wherein the particles are electrically charged or chargeable, and wherein the particles absorb or reflect light;
at least one current sensing circuit connected to an electrode on a substrate, wherein the current sensing circuit measures a current in the electrode to which it is connected, wherein the light modulator comprises multiple current sensing circuits, each electrode of the multiple electrodes being connected to a corresponding one of the multiple current sensing circuits; and
a controller comprising one or more processor circuits and a non-transitory electronic memory storing computer instructions executable by the one or more processor circuits to perform:
applying an electric potential to at least one of the electrodes according to a measuring potential during a measuring duration,
receiving at least one current sensing signal from the at least one current sensing circuit during the measuring duration indicating a current in the connected electrode,
determining driving signals for the multiple electrodes from the at least one current sensing signals and from a target transparency or reflectivity, and
applying an electric potential to the multiple electrodes according to a driving signal after the measuring duration to obtain an electro-magnetic field between the multiple electrodes, wherein the electro-magnetic field provides electrophoretic movement of the particles towards or from one of the multiple electrodes.

2. A light modulator as in claim 1, wherein the driving signal is provided as an alternating current (AC) in the multiple electrodes such that a substantially balanced electrolysis current is obtained.

3. A light modulator as in claim 1, wherein the driving signal is provided as a direct current (DC) in the multiple electrodes, wherein the voltage is periodically reversed to such extent that a substantially balanced electrolysis current is obtained.

4. A light modulator as in claim 1, wherein the first substrate and the second substrate are transparent.

5. A light modulator as in claim 1, wherein one of the first and the second substrates is transparent and one of the first and second substrates is reflective or partially reflective.

6. A light modulator as in claim 1, wherein the computer instructions are executable to perform
determining a transparency or a reflectivity level of the light modulator from the at least one current sensing signals.

7. A light modulator as in claim 1, wherein the electric potential is a constant AC signal, all electrodes being driven with the constant AC signal simultaneously or consecutively to assess the current during the measuring duration on all electrodes.

8. A light modulator as in claim 1, wherein the computer instructions are executable to perform measuring the current in the electrode periodically.

9. A light modulator as in claim 8, comprising a temperature sensor, wherein the temperature sensor measures at least one of an outside temperature, inside temperature, and a fluid temperature in the optical layer, the computer instructions being executable to perform receiving a temperature signal from the temperature sensor, the controller determining a current measuring periodicity from the temperature signal.

10. A light modulator as in claim 1, wherein the computer instructions are executable to perform determining a driving signal for each electrode, driving signals for at least three of the multiple electrodes on the first and second substrate being different, causing different electric potentials to be applied to at least three electrodes at the same time.

11. A light modulator as in claim 1, wherein the computer instructions are executable to perform a calibration of the light modulator, the calibration comprising
applying an electric potential to the multiple electrodes to drive the light modulator to maximum transparency, and/or to minimum transparency, and/or to maximum reflectivity, and/or to minimum reflectivity, and
receiving at least one current sensing signal from the at least one current sensing circuits corresponding to maximum transparency, and/or to minimum transparency, and/or to maximum reflectivity, and/or to minimum reflectivity.

12. A light modulator as in claim 11, wherein in a use phase after calibration, the driving signal is determined from at least one current sensing signal obtained in the use phase, from the at least one current sensing signals obtained in the calibration and from a target transparency or reflectivity.

13. A light modulator as in claim 11, wherein the computer instructions are executable to perform calibrating for at least one of: turning the light modulator on for the first time, turning the light modulator on after being turned off for more than a threshold time, measuring out of range currents, a transparency or reflectivity level not being reached within a threshold time.

14. A light modulator as in claim 1, wherein determining a driving signal comprises determining one or more of a voltage, an AC frequency, a bias, a waveform shape and a duty cycle for each of the electrodes.

15. A light modulator as in claim 1, wherein the target transparency or reflectivity is derived from a user input and/or sensor signal from a light sensor.

16. A light modulator as in claim 1, wherein the computer instructions are executable to perform, when the target transparency or reflectivity of the light modulator is reached or is within a threshold of the target transparency or reflectivity,
reducing an amplitude or duty cycle of the electric potential applied to the electrodes, and/or
changing a current measuring periodicity.

17. A light modulator as in claim 1, wherein
the computer instructions are executable to perform maintaining an age of the light modulator, determining the driving signals further depending on said age, and/or
the light modulator comprises a temperature sensor, wherein the temperature sensor measures at least one of an outside temperature, inside temperature, and a fluid temperature in the optical layer, the computer instructions are executable to perform receiving a temperature signal from the temperature sensor, determining the driving signals further depending on the temperature signal.

18. A light modulator as in claim 1, wherein the driving signals are determined according to a dynamic feedback control algorithm.

19. A light modulator method comprising:
providing a light modulator comprising:
a first substrate and a second substrate, the first and second substrates being arranged with inner sides opposite to each other, multiple electrodes being applied to the inner side of the first substrate and multiple electrodes being applied to the inner side of the second substrate, each of the multiple electrodes on the first and second substrates being arranged in a pattern across the substrate, the multiple electrodes each comprising
a multiple of main-lines extending across the substrate in a first direction, the multiple of main-lines of the multiple electrodes being arranged alternatingly with respect to each other on the substrate;
an optical layer between at least the first and second substrate, the optical layer comprising
a fluid comprising particles, wherein the particles are electrically charged or chargeable, and wherein the particles absorb or reflect light;
multiple current sensing circuits, each electrode of the multiple electrodes being connected to a corresponding one of the multiple current sensing circuits, wherein the current sensing circuit measures a current in the electrode to which it is connected;
applying an electric potential to at least one of the electrodes according to a measuring potential during a measuring duration,
receiving at least one current sensing signal from the at least one current sensing circuits during the measuring duration indicating current in a corresponding electrode,
determining driving signals for the electrodes from the at least one current sensing signals and from a target transparency or reflectivity, and
transmitting the driving signal to the light modulator for applying an electric potential to the multiple electrodes according to the driving signal after the measuring duration to obtain an electro-magnetic field between the multiple electrodes, wherein the electro-magnetic field provides electrophoretic movement of the particles towards or from one of the multiple electrodes.

20. A non-transitory computer readable medium comprising data representing instructions, which when executed by a processor system, cause the processor system to perform the method according to claim 19.

* * * * *